US012470865B2

(12) United States Patent
Hayashi et al.

(10) Patent No.: US 12,470,865 B2
(45) Date of Patent: Nov. 11, 2025

(54) BLOCKING ELEMENT AND DISPLAY DEVICE INCLUDING THE SAME

(71) Applicant: Samsung Display Co., LTD., Yongin-si (KR)

(72) Inventors: Hidekazu Hayashi, Yongin-si (KR); Kyoung Ho Park, Yongin-si (KR); Hyun Su Park, Yongin-si (KR); Ki Cheol Song, Yongin-si (KR); Taek Sun Shin, Yongin-si (KR); Tae Hee Yoon, Yongin-si (KR); Gyu Su Lee, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 294 days.

(21) Appl. No.: 18/192,166

(22) Filed: Mar. 29, 2023

(65) Prior Publication Data

US 2023/0412972 A1 Dec. 21, 2023

(30) Foreign Application Priority Data

Jun. 21, 2022 (KR) ........................ 10-2022-0075222

(51) Int. Cl.

| | |
|---|---|
| ***H04R 1/28*** | (2006.01) |
| ***H04R 1/02*** | (2006.01) |
| ***H04R 7/04*** | (2006.01) |
| ***H04R 9/02*** | (2006.01) |
| ***H04R 9/04*** | (2006.01) |
| ***H04R 9/06*** | (2006.01) |

(52) U.S. Cl.

CPC ............. *H04R 1/288* (2013.01); *H04R 1/028* (2013.01); *H04R 7/04* (2013.01); *H04R 9/025* (2013.01); *H04R 9/046* (2013.01); *H04R 9/06* (2013.01); *H04R 2499/15* (2013.01)

(58) Field of Classification Search

CPC ...... H04R 2499/15; H04R 1/028; H04R 7/04; H04R 9/025; H04R 9/046; H04R 9/06; H04R 2499/11; H04R 2400/03

USPC ................................ 381/333, 152, 306, 388

See application file for complete search history.

(56) References Cited

U.S. PATENT DOCUMENTS

| | | | | |
|---|---|---|---|---|
| 2020/0213699 A1* | 7/2020 | You | ........................ | H04R 7/045 |
| 2021/0031489 A1* | 2/2021 | Huang | .................... | B32B 7/022 |

FOREIGN PATENT DOCUMENTS

| | | |
|---|---|---|
| JP | 2020-532449 | 11/2020 |
| KR | 10-1815900 | 1/2018 |
| KR | 10-2315650 | 10/2021 |

* cited by examiner

*Primary Examiner* — Norman Yu

(57) ABSTRACT

A display device includes a display panel including a substrate including a first side extending in a first direction and a second side extending in a second direction intersecting the first direction, and a light emitting element layer positioned on a first surface of the substrate, a first vibrating element disposed on a second surface of the substrate and that vibrates the display panel to output a first sound, a first buffer layer disposed on the second surface of the substrate and disposed between the first side and the first vibrating element, and a second buffer layer disposed on the second surface of the substrate and disposed between the second side and the first vibrating element. The first buffer layer includes a first pore, and the second buffer layer includes a second pore.

14 Claims, 28 Drawing Sheets

BLOCKING ELEMENT AND DISPLAY DEVICE INCLUDING THE SAME

CROSS-REFERENCE TO RELATED APPLICATION(S)

This application claims priority to and benefits of Korean Patent Application No. 10-2022-0075222 under 35 U.S.C. § 119, filed on Jun. 21, 2022 in the Korean Intellectual Property Office (KIPO), the entire contents of which are incorporated herein by reference.

BACKGROUND

1. Technical Field

The disclosure relates to a blocking element and a display device including the same.

2. Description of the Related Art

With the advance of information-oriented society, more and more demands are placed on display devices for displaying images in various ways. For example, display devices have been applied to various electronic devices such as smartphones, tablet PCs, digital cameras, laptop computers, navigation devices, monitors and TVs. A display device may be a flat panel display device such as a liquid crystal display device, a field emission display device, an organic light emitting display device, or a quantum dot light emitting display device.

A display device may include a display panel for displaying an image, a sound generating device outputting a high-frequency sound by vibrating the display panel, and a woofer outputting a low-frequency sound. The high-frequency sound generated by vibrating the display panel by the sound generating device may be outputted toward the front side of the display device, whereas the low-frequency sound may be outputted toward another side of the display device rather than the front side of the display device because the woofer is disposed on the rear surface of the display device. Accordingly, a user may feel different presences from the high-frequency sound and the low-frequency sound of the display device.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

Aspects of the disclosure provide a display device capable of improving sound quality by outputting sound toward the front side of the display device by vibrating a display panel using a sound generating device.

Aspects of the disclosure also provide a display device capable of improving sound quality of the display device by further including a blocking element disposed around the sound generating device.

However, aspects of the disclosure are not restricted to those set forth herein. The above and other aspects of the disclosure will become more apparent to one of ordinary skill in the art to which the disclosure pertains by referencing the detailed description of the disclosure given below.

According to an embodiment of the disclosure, a display device may include a display panel including a substrate including a first side extending in a first direction and a second side extending in a second direction intersecting the first direction, and a light emitting element layer positioned on a first surface of the substrate, a first vibrating element disposed on a second surface of the substrate and that vibrates the display panel to output a first sound, a first buffer layer disposed on the second surface of the substrate and disposed between the first side and the first vibrating element, and a second buffer layer disposed on the second surface of the substrate and disposed between the second side and the first vibrating element. The first buffer layer may include a first pore, and the second buffer layer may include a second pore. A first sound propagation coefficient value of the first buffer layer and a second sound propagation coefficient value of the second buffer layer satisfy the following Eq. (1):

$$1014<C<1565 \quad (1)$$

where C is the sound propagation coefficient of the first buffer layer and the second buffer layer, and has a unit of cm/s, and the C satisfies the following Eq. (2):

$$C=\sqrt{\frac{CFD}{\rho_s}} \quad (2)$$

where CFD is a load value received by the first buffer layer and the second buffer layer in case that a thickness of the first buffer layer and the second buffer layer is compressed by 25%, and has a unit of gf/cm$^2$, the $\rho_s$ is an estimated density of the first buffer layer and the second buffer layer, which is estimated from diameters of the first pore included in the first buffer layer and the second pore included in the second buffer layer, and has a unit of g/cm$^3$, and the $\rho_s$ satisfies the following Eq. (3):

$$\rho_s=\frac{328.17-c_s}{528.81} \quad (3)$$

where $c_s$ is the diameter of the first pore included in the first buffer layer and the diameter of the second pore included in the second buffer layer, and has a unit of μm.

In an embodiment, the sound propagation coefficient value of the first buffer layer may be different from the sound propagation coefficient value of the second buffer layer.

In an embodiment, a first sound damping coefficient value of the first buffer layer and a second sound damping coefficient value of the second buffer layer may be 0.2 to 0.4 in a low-frequency sound range, 0.15 to 0.35 in a middle-frequency sound range, and 0.1 to 0.3 in a high-frequency sound range.

In an embodiment, the low-frequency sound range may have a frequency of 1 Hz or more and less than 100 Hz, the middle-frequency sound range may have a frequency of 100 Hz or more and less than 1 kHz, and the high-frequency sound range may have a frequency of 1 kHz or more and less than 10 kHz.

In an embodiment, the diameter of the first pore included in the first buffer layer and the diameter of the second pore included in the second buffer layer may be 120 μm to 250 μm.

In an embodiment, a display device may further include a lower cover disposed on the second surface of the substrate, and a heat dissipation film disposed between the second surface of the substrate and the lower cover, wherein the first buffer layer and the second buffer layer may be disposed between the second surface of the substrate and the lower cover.

In an embodiment, the first vibrating element may include a bobbin disposed on the second surface of the substrate, a voice coil surrounding the bobbin, a magnet disposed on the bobbin and spaced apart from the bobbin, and a lower plate disposed on the magnet and fixed to the lower cover by a fixing member.

In an embodiment, a display device may further include a first adhesive layer disposed on a first surface of the first buffer layer, a second adhesive layer disposed on a second surface of the first buffer layer, a third adhesive layer disposed on a first surface of the second buffer layer, a base film layer disposed on a second surface of the second buffer layer, and a fourth adhesive layer disposed on the second surface of the second buffer layer with the base film layer interposed therebetween.

In an embodiment, a display device may further include a second vibrating element disposed on the second surface of the substrate and that vibrates the display panel to output a second sound, and a third buffer layer disposed on the second surface of the substrate and including a first portion, a second portion, and a third portion. The first portion may extend in the first direction and is disposed between the first vibrating element and the first side and between the second vibrating element and the first side. The second portion and the third portion may extend from the first portion in the second direction and may be disposed between the first vibrating element and the second vibrating element. The second portion and the third portion may face each other.

In an embodiment, the first portion of the third buffer layer may be in physical contact with the second buffer layer. The second portion and the third portion of the third buffer layer may be in physical contact with the first buffer layer.

In an embodiment, the third buffer layer may be disposed between the heat dissipation film and the lower cover.

In an embodiment, a sound propagation coefficient value of the third buffer layer may be different from a sound propagation coefficient value of the first buffer layer and a sound propagation coefficient value of the second buffer layer.

In an embodiment, the first buffer layer may contain a first material. The second buffer layer may contain a second material different from the first material.

In an embodiment, the first buffer layer may extend in the first direction. The second buffer layer may extend in the second direction.

According to an embodiment of the disclosure, a display device may include a display panel including a substrate including a first side extending in a first direction and a second side extending in a second direction intersecting the first direction, and a light emitting element layer positioned on a first surface of the substrate, a first vibrating element disposed on a second surface of the substrate and that vibrates the display panel to output a first sound, a second vibrating element disposed on the second surface of the substrate and that vibrates the display panel to output a second sound, a first buffer layer extending in the first direction and disposed between the first side and the first vibrating element and between the first side and the second vibrating element, a second buffer layer extending in the second direction and disposed between the second side and the first vibrating element and between the second side and the second vibrating element, and a third buffer layer including a first portion, a second portion, and a third portion. The first portion of the third buffer layer may extend in the first direction and may be disposed between the first vibrating element and the first side and between the second vibrating element and the first side. The second portion and the third portion of the third buffer layer may extend from the first portion in the second direction and may be disposed between the first vibrating element and the second vibrating element. Diameters of a first pore included in the first buffer layer, a second pore included in the second buffer layer, and a third pore included in the third buffer layer may be different from each other.

In an embodiment, a compression force deflection (CFD) (25%) value of the first buffer layer, a CFD (25%) value of the second buffer layer, and a CFD (25%) value of the third buffer layer may be 0.35 to 0.55.

In an embodiment, a display device may further include a fourth buffer layer including a first portion extending in the first direction and disposed between the first buffer layer and the third buffer layer and a second portion extending in the second direction and disposed between the second buffer layer and the first vibrating element and between the second buffer layer and the second vibrating element. The fourth buffer layer may include a fourth pore. A diameter of the fourth pore may be different from the diameter of the first pore, the diameter of the second pore, and the diameter of the third pore.

In an embodiment, the first buffer layer may be in physical contact with the second buffer layer. The first portion of the third buffer layer may be in physical contact with the second portion of the fourth buffer layer. The second portion and the third portion of the third buffer layer may be in physical contact with the first portion of the fourth buffer layer.

In an embodiment, sound damping coefficient values of the first buffer layer, the second buffer layer, the third buffer layer, and the fourth buffer layer may be 0.2 to 0.4 in a sound range having a frequency of 1 Hz or more and less than 100 Hz, 0.15 to 0.35 in a sound range having a frequency of 100 Hz or more and less than 1 kHz, and 0.1 to 0.3 in a sound range having a frequency of 1 kHz or more and less than 10 kHz.

According to an embodiment of the disclosure, a blocking element may include a buffer layer including a pore, wherein the buffer layer satisfies the following Eq. (1):

$$1014 < C < 1565 \tag{1}$$

where C is a sound propagation coefficient of the buffer layer, and has a unit of cm/s, and the C satisfies the following Eq. (2):

$$C = \sqrt{\frac{CFD}{\rho_s}} \tag{2}$$

where CFD is a load value received by the buffer layer in case that a thickness of the buffer layer is compressed by 25%, and has a unit of $gf/cm^2$, the $\rho_s$ is an estimated density of the buffer layer, which is estimated from a diameter of the pore included in the buffer layer, and has a unit of g/cm$^3$, and the $\rho_s$ satisfies the following Eq. (3):

$$\rho_s = \frac{328.17 - c_s}{528.81} \quad (3)$$

where $c_s$ is the diameter of the pore included in the buffer layer, and has a unit of μm.

In accordance with a display device according to an embodiment, the sound generating device may output low-frequency sound and high-frequency sound by using the display panel as a diaphragm. For example, it may be possible to provide the display device capable of outputting low-frequency sound and high-frequency sound toward the front side of the display device, reducing the displacement of vibration occurring in the panel by the blocking element disposed around the sound generating device, and improving sound quality by achieving sound pressure balance in a low-frequency sound range, a middle-frequency sound range, and a high-frequency sound range.

However, the effects of the disclosure are not limited to the aforementioned effects, and various other effects are included in the disclosure.

BRIEF DESCRIPTION OF THE DRAWINGS

The above and other aspects and features of the disclosure will become more apparent by describing in detail embodiments thereof with reference to the attached drawings, in which.

DETAILED DESCRIPTION OF THE EMBODIMENTS

Figure 1:
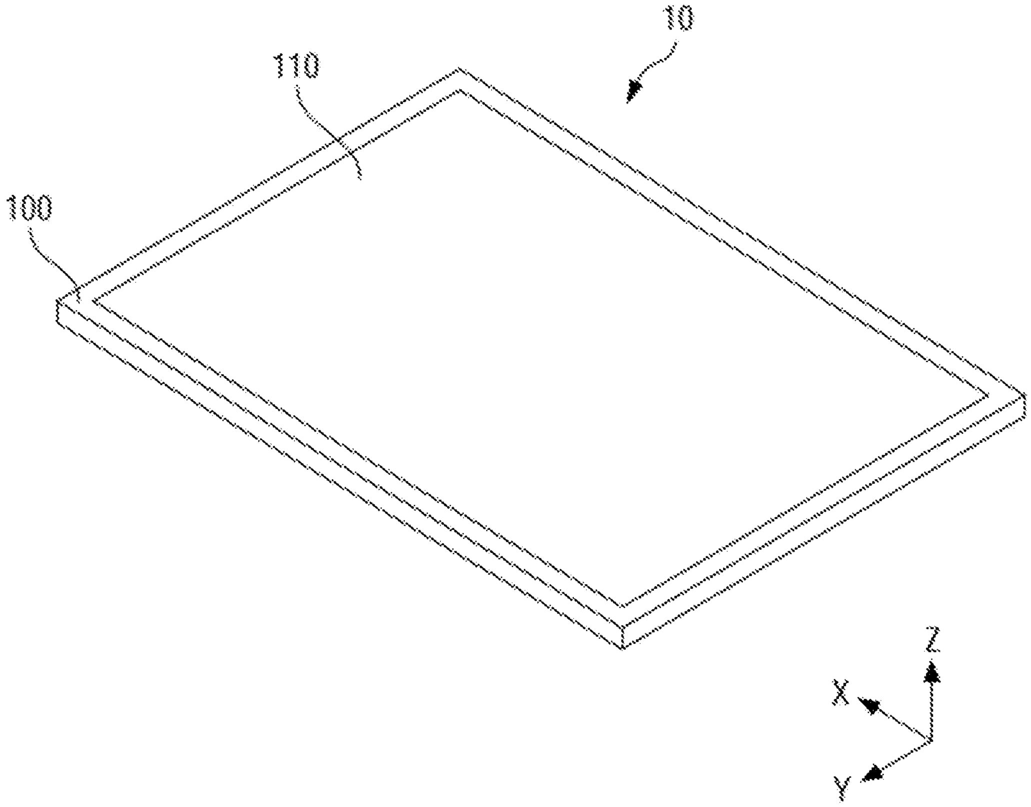
FIG. 1 is a schematic perspective view illustrating a display device according to an embodiment.

The disclosure will now be described more fully hereinafter with reference to the accompanying drawings, in which embodiments are shown. This disclosure may, however, be embodied in different forms and should not be construed as limited to the embodiments set forth herein. Rather, these embodiments are provided so that this disclosure will be thorough and complete, and will fully convey the scope of the disclosure to those skilled in the art.

As used herein, the singular forms, "a," "an," and "the" are intended to include the plural forms as well, unless the context clearly indicates otherwise.

It will also be understood that when a layer is referred to as being "on" another layer or substrate, it can be directly on the other layer or substrate, or intervening layers may also be present. The same reference numbers indicate the same components throughout the specification.

It will be understood that, although the terms "first," "second," etc. may be used herein to describe various elements, these elements should not be limited by these terms. These terms are only used to distinguish one element from another element. For instance, a first element discussed below could be termed a second element without departing from the teachings of the disclosure. Similarly, the second element could also be termed the first element.

Features of each of various embodiments of the disclosure may be partially or entirely combined with each other and may technically variously interwork with each other, and respective embodiments may be implemented independently of each other or may be implemented together in association with each other.

In the specification and the claims, the term "and/or" is intended to include any combination of the terms "and" and "or" for the purpose of its meaning and interpretation. For example, "A and/or B" may be understood to mean any combination including "A, B, or A and B." The terms "and" and "or" may be used in the conjunctive or disjunctive sense and may be understood to be equivalent to "and/or."

The terms “overlap” or “overlapped” mean that a first object may be above or below or to a side of a second object, and vice versa. Additionally, the term “overlap” may include layer, stack, face or facing, extending over, covering, or partly covering or any other suitable term as would be appreciated and understood by those of ordinary skill in the art.

When an element is described as “not overlapping” or to “not overlap” another element, this may include that the elements are spaced apart from each other, offset from each other, or set aside from each other or any other suitable term as would be appreciated and understood by those of ordinary skill in the art.

The terms “face” and “facing” mean that a first element may directly or indirectly oppose a second element. In a case in which a third element intervenes between the first and second element, the first and second element may be understood as being indirectly opposed to one another, although still facing each other.

“About” or “approximately” or “substantially” as used herein is inclusive of the stated value and indicates within an acceptable range of deviation for the particular value as determined by one of ordinary skill in the art, considering the measurement in question and the error associated with measurement of the particular quantity (i.e., the limitations of the measurement system). For example, “about” may mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which the disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Although a case in which a display device 10 is an organic light emitting display device using an organic light emitting element as a light emitting element is described, the disclosure is not limited thereto. For example, the display device 10 according to an embodiment may be an inorganic light emitting display device using a micro light emitting diode, a nano light emitting diode, a quantum dot light emitting diode, or another inorganic semiconductor (inorganic light emitting diode) as a light emitting element.

Figure 2:
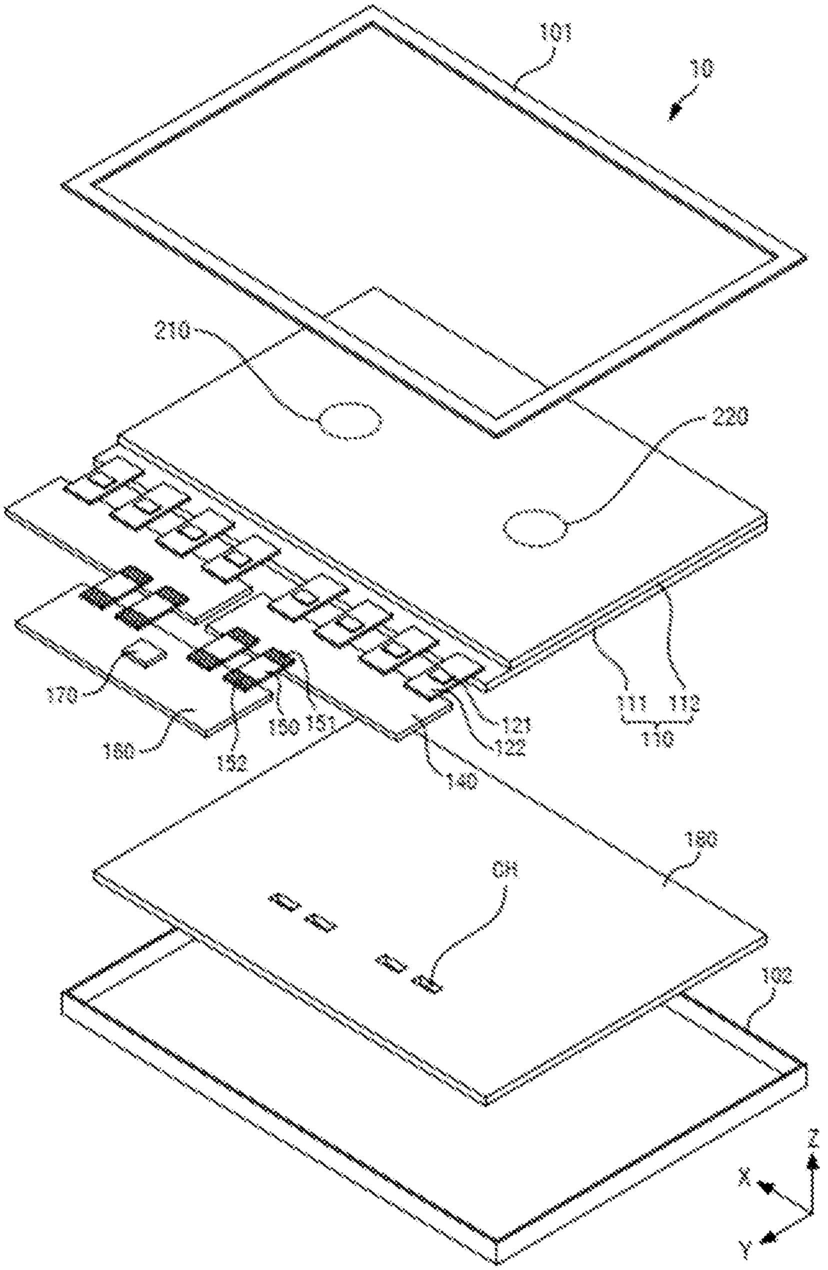
FIG. 2 is an exploded schematic perspective view showing a display device according to an embodiment.
Figure 3:
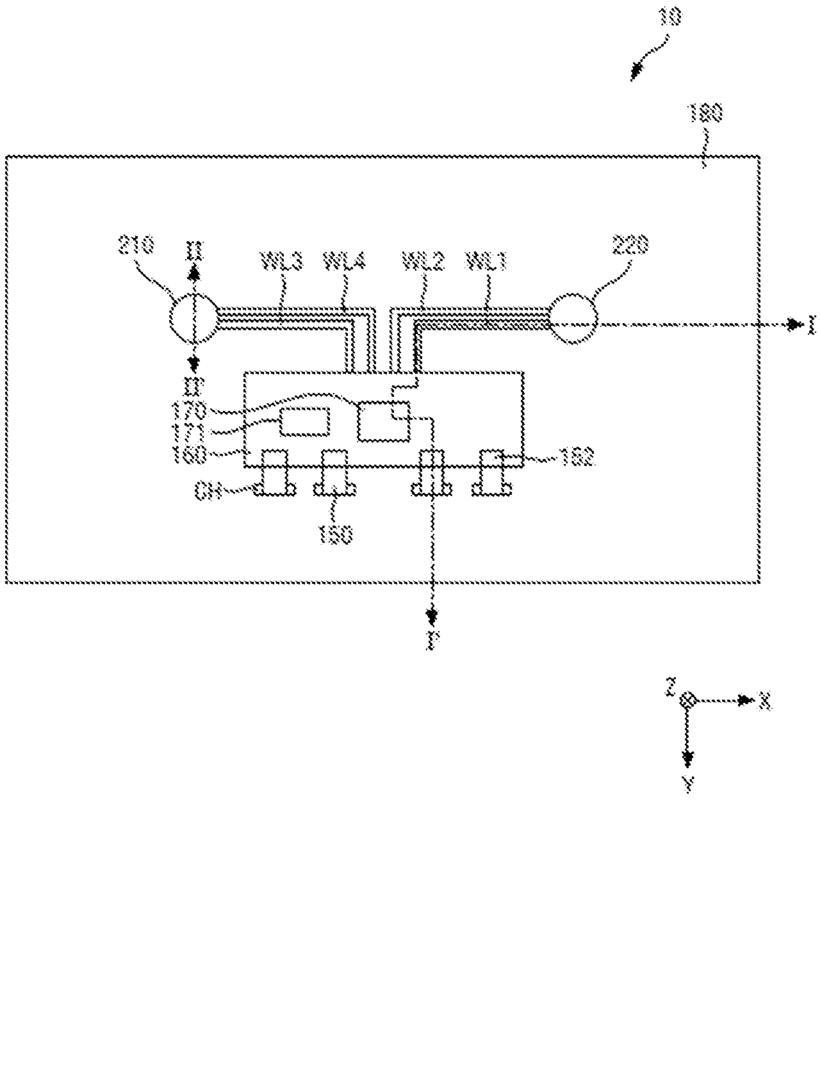
FIG. 3 is a schematic bottom view of a display device according to an embodiment.
Figure 4:
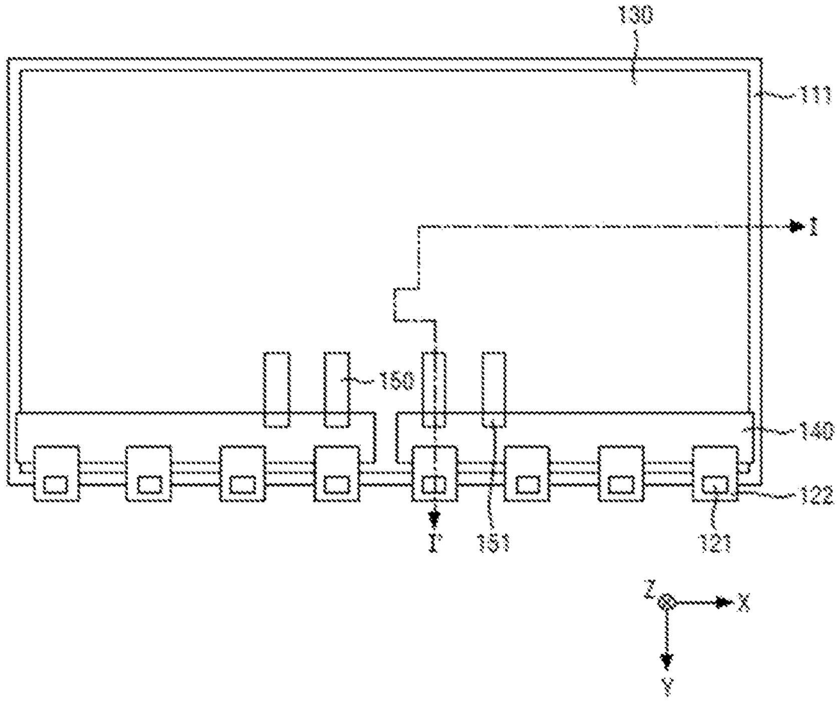
FIG. 4 is a schematic bottom view of a display device in which a lower cover and a control circuit board are omitted in the display device of FIG. 3.
Figure 5:
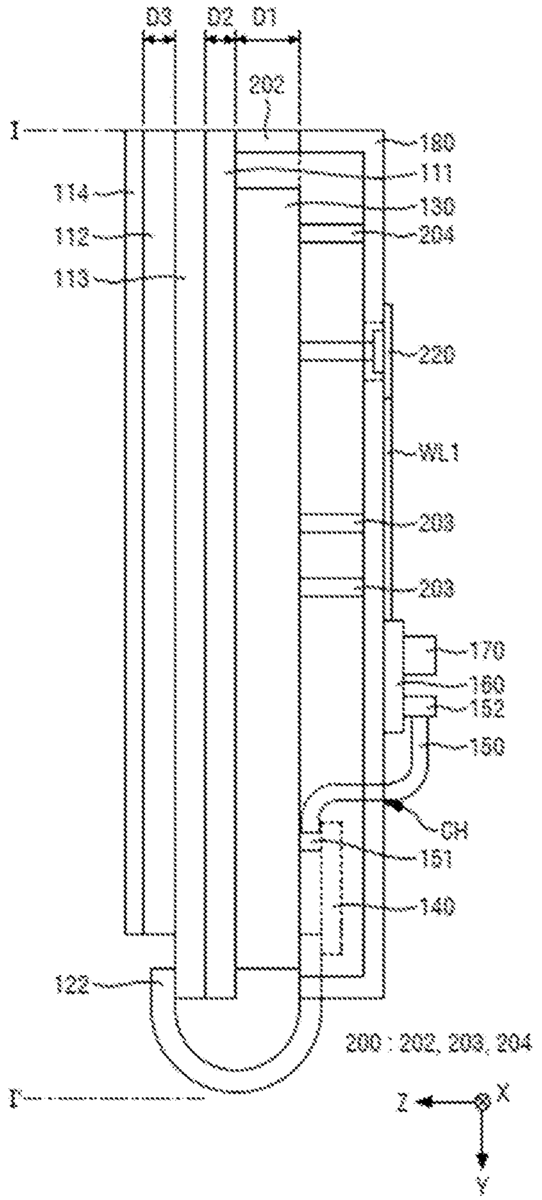
FIG. 5 is a schematic cross-sectional view of the display device taken along line I-I' of FIGS. 3 and 4.

FIG. 1 is a schematic perspective view illustrating a display device according to an embodiment. FIG. 2 is an exploded schematic perspective view showing a display device according to an embodiment. FIG. 3 is a schematic bottom view of a display device according to an embodiment. FIG. 4 is a schematic bottom view of a display device in which a lower cover and a control circuit board are omitted in the display device of FIG. 3. FIG. 5 is a schematic cross-sectional view of the display device taken along line I-I' of FIGS. 3 and 4.

Referring to FIGS. 1 to 5, the display device 10 according to an embodiment may include a set cover 100, a display panel 110, source driving circuits 121, flexible films 122, a heat dissipation film 130, source circuit boards 140, cables 150, a control circuit board 160, a timing control circuit 170, and a lower cover 180.

In this specification, “upper,” “top,” and “top surface” may indicate a direction in which a second substrate 112 is disposed with respect to a first substrate 111 of the display panel 110, i.e., a Z-axis direction, and “lower,” “bottom,” and “bottom surface” may indicate a direction in which the lower cover 180 is disposed with respect to the first substrate 111 of the display panel 110, i.e., a direction opposite to the Z-axis direction. Further, “left”, “right”, “upper” and “lower” may indicate directions when the display panel 110 is viewed from above. For example, the term “left” may indicate an X-axis direction, the term “right” may indicate a direction opposite to the X-axis direction, the term “upper” may indicate a Y-axis direction, and the term “lower” may indicate a direction opposite to the Y-axis direction.

The set cover 100 may be disposed to surround the edge of the display panel 110. The set cover 100 may cover the non-display area except the display area of the display panel 110. Specifically, the set cover 100 may include an upper set cover 101 and a lower set cover 102 as shown in FIG. 2. The upper set cover 101 may be disposed to cover the edge of the top surface of the display panel 110, and the lower set cover 102 may be disposed to cover the bottom surface and side surfaces of the display panel 110. The upper set cover 101 and the lower set cover 102 may be coupled to each other by a fixing member such as a screw or an adhesive member such as a double-sided tape or an adhesive. The upper set cover 101 and the lower set cover 102 may be made of plastic or a metal, or may include both plastic and a metal.

The display panel 110 may have a rectangular shape in plan view. For example, the display panel 110 may have a rectangular shape, in plan view, having long sides in a first direction (X-axis direction) and short sides in a second direction (Y-axis direction) as shown in FIG. 2. A corner formed by the long side in the first direction (X-axis direction) and the short side in the second direction (Y-axis direction) may be right-angled or rounded with a predetermined or given curvature. The planar shape of the display panel 110 is not limited to the rectangular shape, and may be formed in another polygonal shape, a circular shape or an elliptical shape.

Although FIG. 2 illustrates that the display panel 110 is formed to be flat, the disclosure is not limited thereto. For example, the display panel 110 may be bent with a predetermined or given curvature.

The display panel 110 may include the first substrate 111 and a second substrate 112. The first substrate 111 and the second substrate 112 may be rigid and/or flexible. The first substrate 111 may be made of glass and/or plastic. The second substrate 112 may be made of glass, plastic, an encapsulation film, and/or a barrier film. For example, the plastic may be polyethersulphone (PES), polyacrylate (PA), polyarylate (PAR), polyetherimide (PEI), polyethylenenapthalate (PEN), polyethylene terephthalate (PET), polyphenylene sulfide (PPS), polyallylate, polyimide (PI), polycarbonate (PC), cellulose triacetate (CAT), cellulose acetate propionate (CAP), or a combination thereof. The encapsulation film or the barrier film may be a film in which multiple inorganic layers are stacked on each other.

Figure 7:
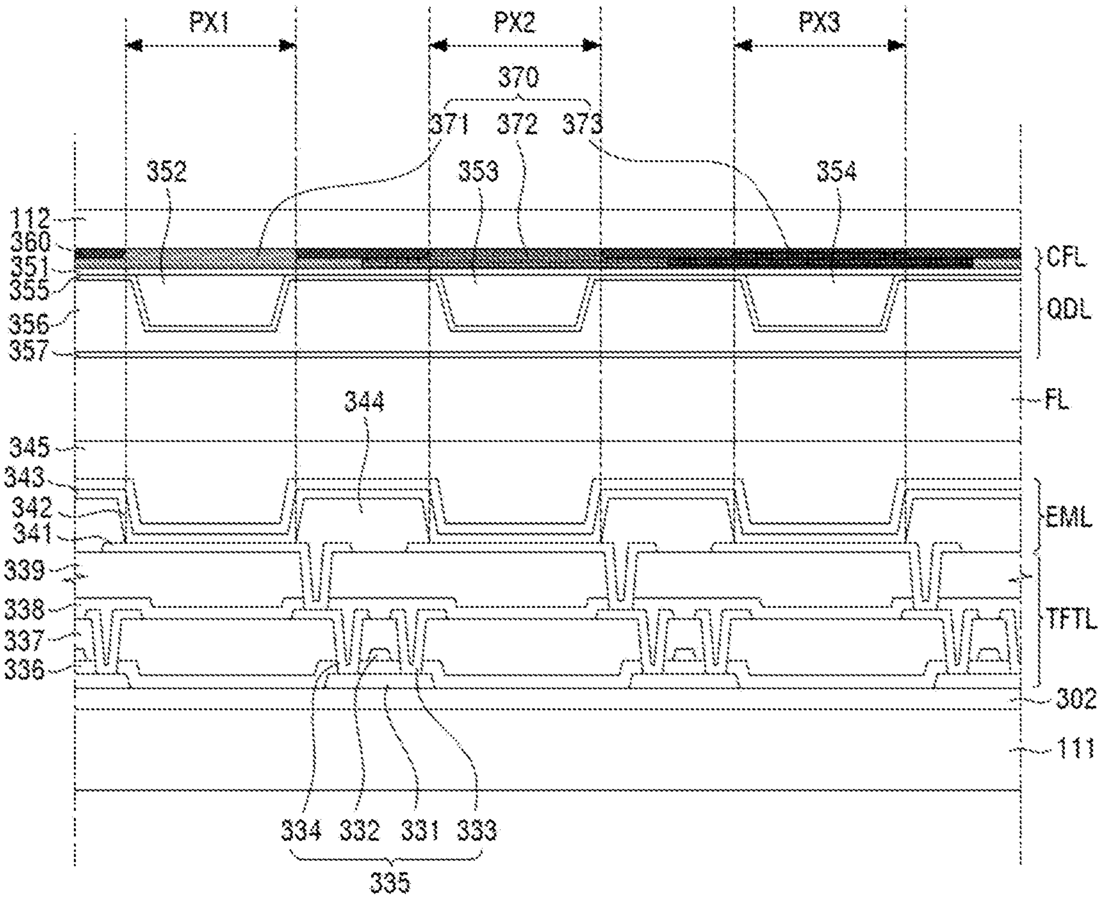
FIG. 7 is a schematic cross-sectional view illustrating an example of a display area of a display panel.

The display panel 110 may include a display layer 113 disposed between the first substrate 111 and the second substrate 112 as shown in FIG. 5. The display layer 113 may include a thin film transistor layer TFTL, a light emitting element layer EML, a filler FL, a wavelength conversion layer QDL, and a color filter layer CFL as shown in FIG. 7. The first substrate 111 may be a thin film transistor substrate on which the thin film transistor layer TFTL, the light emitting element layer EML, and a thin film encapsulation layer are formed, the second substrate 112 may be a color filter substrate on which the wavelength conversion layer QDL and the color filter layer CFL are formed, and the filler FL may be disposed between the thin film encapsulation layer of the first substrate 111 and the wavelength conversion layer QDL of the second substrate 112. The display layer 113 of the display panel 110 will be described in detail later with reference to FIG. 7.

The display panel 110 may further include a polarizing film 114 disposed on the second substrate 112 as shown in FIG. 5. The polarizing film 114 may be attached to the second substrate 112 to prevent a decrease in visibility due to reflection of external light.

A side of the flexible films 122 may be attached to a surface of the first substrate 111 of the display panel 110, and another side of the flexible films 122 may be attached to a surface of the source circuit board 140. Specifically, the size of the first substrate 111 may be greater than the size of the second substrate 112, so that a side of the first substrate 111 may be exposed without being covered by the second substrate 112. The flexible films 122 may be attached to a side of the first substrate 111 that is exposed without being covered by the second substrate 112. Each of the flexible films 122 may be attached to a surface of the first substrate 111 and a surface of the source circuit board 140 using an anisotropic conductive film.

Each of the flexible films 122 may be a tape carrier package or a chip on film. Each of the flexible films 122 may be bent. Accordingly, the flexible films 122 may be bent to the position under the first substrate 111 as shown in FIGS. 4 and 5. The source circuit boards 140, the cables 150, and the control circuit board 160 may be disposed on the bottom surface of the first substrate 111.

Although FIG. 2 according to an embodiment illustrates that eight flexible films 122 are attached to the first substrate 111 of the display panel 110, the number of flexible films 122 is not limited thereto.

The source driving circuit 121 may be disposed on a surface of each of the flexible films 122. The source driving circuits 121 may be formed of an integrated circuit (IC). Each of the source driving circuits 121 may convert digital video data into analog data voltages in response to a source control signal of the timing control circuit 170 and supply them to data lines of the display panel 110 through the flexible films 122.

Each of the source circuit boards 140 may be connected to the control circuit board 160 through the cables 150. To this end, each of the source circuit boards 140 may include first connectors 151 to be connected to the cables 150. The source circuit boards 140 may be a flexible printed circuit board or a printed circuit board. The cables 150 may be flexible cables.

The control circuit board 160 may be connected to the source circuit boards 140 through the cables 150. To this end, the control circuit board 160 may include second connectors 152 to be connected to the cables 150. The control circuit board 160 may be a flexible printed circuit board or a printed circuit board.

Although FIG. 2 according to an embodiment illustrates that four cables 150 connect the source circuit boards 140 and the control circuit board 160, the number of cables 150 is not limited thereto. Further, although FIG. 1 illustrates two source circuit boards 140, the number of source circuit boards 140 is not limited thereto.

The timing control circuit 170 may be disposed on a surface of the control circuit board 160. The timing control circuit 170 may be formed of an integrated circuit. The timing control circuit 170 may receive digital video data and timing signals from the system-on-chip of the system circuit board, and may generate the source control signal for controlling the timing of the source driving circuits 121 in response to the timing signals.

The system-on-chip may be mounted on the system circuit board connected to the control circuit board 160 through another flexible cable, and may be formed of an integrated circuit. The system-on-chip may be a processor of a smart TV, a central processing unit (CPU) or a graphic card of a computer or a laptop computer, or an application processor of a smart phone or a tablet PC. The system circuit board may be a flexible printed circuit board or a printed circuit board.

A power supply circuit may be additionally attached to a surface of the control circuit board 160. The power supply circuit may generate voltages that may be required for driving the display panel 110 from a main power source applied from the system circuit board and supply the voltages to the display panel 110. For example, the power supply circuit may generate a high potential voltage, a low potential voltage, and an initialization voltage for driving an organic light emitting element and supply them to the display panel 110. Further, the power supply circuit may generate and supply driving voltages for driving the source driving circuits 121, the timing control circuit 170, and the like. The power supply circuit may be formed of an integrated circuit. In other embodiments, the power supply circuit may be disposed on a power circuit board separately formed in addition to the control circuit board 160. The power circuit board may be a flexible printed circuit board or a printed circuit board.

As shown in FIGS. 4 and 5, the heat dissipation film 130 may be disposed on another surface of the first substrate 111 that may not face the second substrate 112, i.e., on the bottom surface of the first substrate 111. Further, a first sound generating device 210 and a second sound generating device 220 may be disposed on a surface of the heat dissipation film 130 that may not face the first substrate 111, i.e., on the bottom surface of the heat dissipation film 130. The heat dissipation film 130 may serve to dissipate heat generated by the first sound generating device 210 and the second sound generating device 220. To this end, the heat dissipation film 130 may include a metal layer such as graphite, silver (Ag), copper (Cu), and/or aluminum (Al) having high thermal conductivity.

Further, the heat dissipation film 130 may include multiple graphite layers or multiple metal layers formed in the first direction (X-axis direction) and the second direction (Y-axis direction) rather than the third direction (Z-axis direction). The heat generated by the first sound generating device 210 and the second sound generating device 220 may be diffused in the first direction (X-axis direction) and the second direction (Y-axis direction), and thus may be more effectively released. The first direction (X-axis direction) may be the width direction (or horizontal direction) of the display panel 110, the second direction (Y-axis direction) may be the height direction (or vertical direction) of the display panel 110, and the third direction (Z-axis direction) may be the thickness direction of the display panel 110. Therefore, the influence of the heat generated by the first sound generating device 210 and the second sound generating device 220 on the display panel 110 may be minimized by the heat dissipation film 130.

Further, in order to prevent the heat generated by the first sound generating device 210 and the second sound generating device 220 from affecting the display panel 110, as shown in FIGS. 4 and 5, the heat dissipation film 130 may have a thickness D1 greater than a thickness D2 of the first substrate 111 and a thickness D3 of the second substrate 112.

The size of the heat dissipation film 130 may be smaller than the size of the first substrate 111, so that the edge of a surface of the first substrate 111 may be exposed without being covered by the heat dissipation film 130. However, the disclosure is not limited thereto, and in some embodiments, the heat dissipation film 130 may cover the entire bottom surface of the first substrate 111.

Referring to FIGS. 2 and 3, the first sound generating device 210 may be disposed adjacent to the left side of the display panel 110, and the second sound generating device 220 may be disposed adjacent to the right side of the display panel 110. Therefore, the front left sound may be outputted to the left front surface of the display panel 110 by the first sound generating device 210 and the front right sound may be outputted to the right front surface of the display panel 110 by the second sound generating device 220, which makes it possible to provide stereophonic sound to a user.

Although FIGS. 2 and 3 according to an embodiment illustrate that the first sound generating device 210 and the second sound generating device 220 have a circular shape in plan view, the disclosure is not limited thereto. For example, in some embodiments, the first sound generating device 210 and the second sound generating device 220 may be formed in a polygonal shape such as an elliptical shape or a quadrilateral shape in plan view. The first sound generating device 210 may be connected to the control circuit board 160 through a third sound line WL3 and a fourth sound line WL4. Further, the second sound generating device 220 may be connected to the control circuit board 160 through a first sound line WL1 and a second sound line WL2.

Specifically, the flexible films 122 may be bent to the position under the heat dissipation film 130 as shown in FIGS. 3, 4, and 5, so that the source circuit board 140 may be disposed on a surface of the heat dissipation film 130. The source circuit board 140 may be disposed on a surface of the heat dissipation film 130, whereas the control circuit board 160 may be disposed on a surface of the lower cover 180. For example, the source circuit board 140 may be disposed between a surface of the heat dissipation film 130 and another surface of the lower cover 180. Accordingly, the cable 150 connected to the first connector 151 of the source circuit board 140 may be connected to the second connector 152 of the control circuit board 160 through a cable hole CH penetrating the lower cover 180.

A sound driving circuit 171 as well as the timing control circuit 170 may be disposed on the control circuit board 160. The sound driving circuit 171 may receive a sound control signal, which may be a digital signal, from the system circuit board. The sound driving circuit 171 may be formed of an integrated circuit and disposed on the control circuit board 160 or the system board. The sound driving circuit 171 may include a digital signal processor (DSP) for processing a sound control signal that is a digital signal, a digital analog converter (DAC) for converting the digital signal processed by the digital signal processor into driving voltages that are analog signals, an amplifier (AMP) for amplifying and outputting the analog driving voltages converted by the digital analog converter, or the like. The analog driving voltages may include a positive driving voltage and a negative driving voltage. The sound driving circuit 171 may generate a sound signal for driving the first sound generating device 210 and the second sound generating device 220 in response to the sound control signal.

As shown in FIG. 3, in case that the sound driving circuit 171, the first sound generating device 210, and the second sound generating device 220 are disposed on the lower cover 180, the first sound generating device 210 and the second sound generating device 220 may be fixed to the lower cover 180.

Specifically, in case that the flexible films 122 are bent toward the bottom surface, the control circuit board 160 may be disposed on the bottom surface of the lower cover 180. Each of the third sound line WL3 and the fourth sound line WL4 may electrically connect the control circuit board 160 and the first sound generating device 210. Accordingly, the first sound generating device 210 may receive the front left sound signal through the third sound line WL3 and the fourth sound line WL4. The front left sound signal may include a first driving voltage and a second driving voltage. The first sound generating device 210 may receive the first driving voltage through the third sound line WL3, and may receive the second driving voltage through the fourth sound line WL4. Therefore, the first sound generating device 210 may output the front left sound by vibrating the display panel 110 in response to the first driving voltage and the second driving voltage. Further, each of the first sound line WL1 and the second sound line WL2 may electrically connect the control circuit board 160 and the second sound generating device 220. Accordingly, the second sound generating device 220 may receive the front right sound signal through the first sound line WL1 and the second sound line WL2. The front right sound signal may include a third driving voltage and a fourth driving voltage. The second sound generating device 220 may receive the third driving voltage through the first sound line WL1, and may receive the fourth driving voltage through the second sound line WL2. Therefore, the second sound generating device 220 may output the front right sound by vibrating the display panel 110 in response to the third driving voltage and the fourth driving voltage.

The first sound generating device 210 and the second sound generating device 220 may be vibrating devices capable of vibrating the display panel 110 in the third direction (Z-axis direction). The display panel 110 may serve as a diaphragm for outputting sound.

Figure 8:
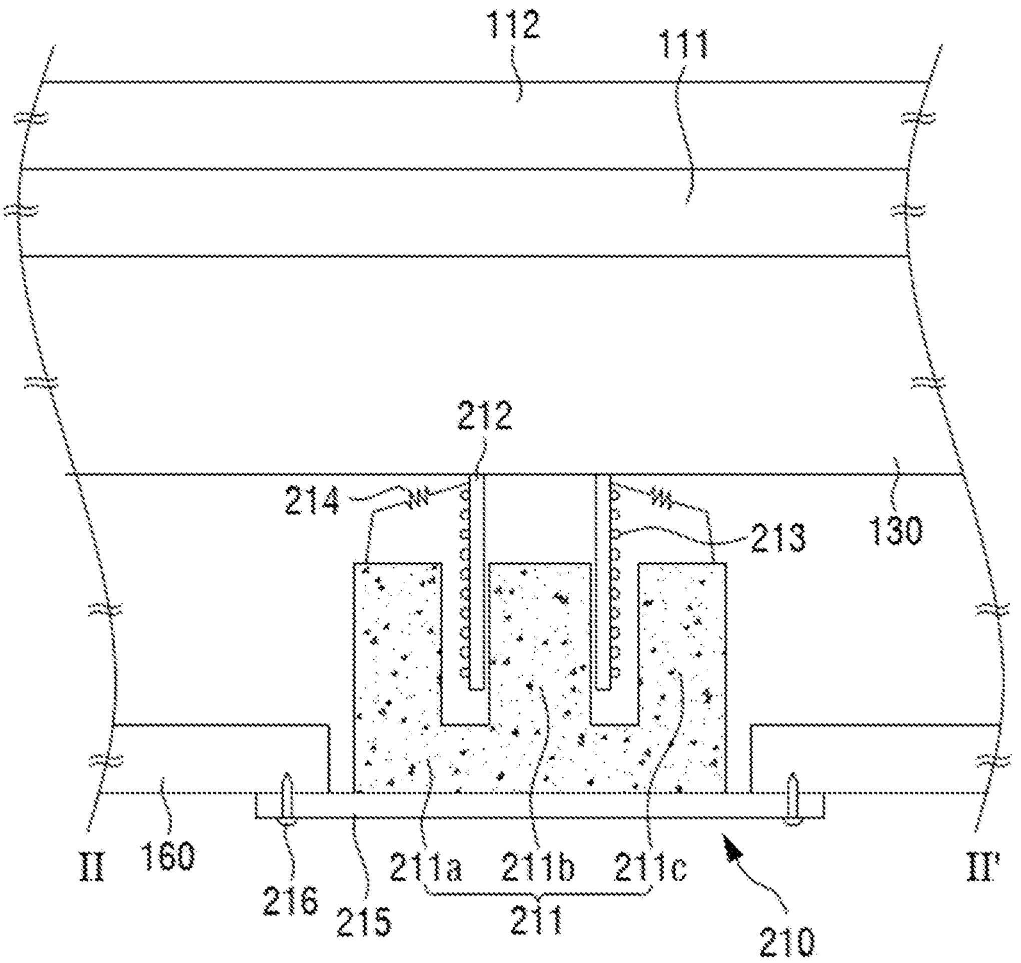
FIG. 8 is a schematic cross-sectional view of the first sound generating device taken along line II-II' of FIG. 3 according to an embodiment.
Figure 9:
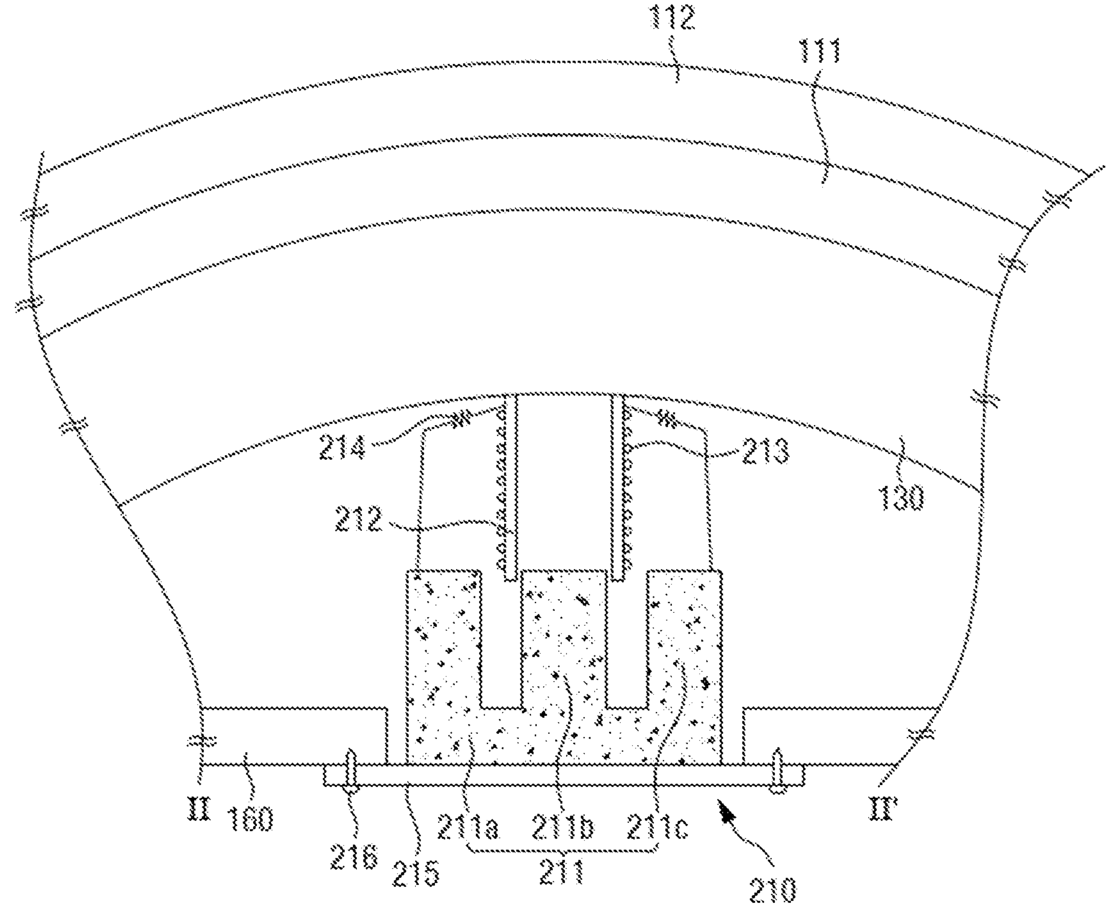
FIGS. 9 and 10 are schematic cross-sectional views illustrating vibration of the display panel by the first sound generating device shown in FIG. 8.
Figure 10:
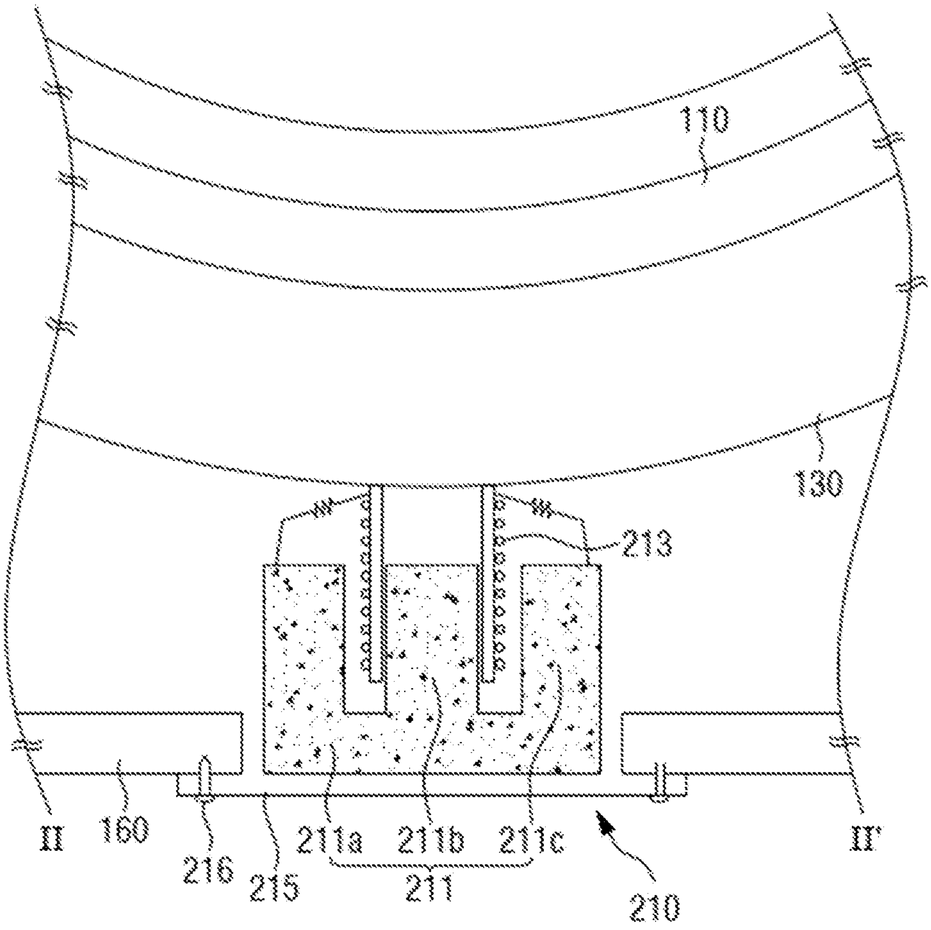

Specifically, the first sound generating device 210 and the second sound generating device 220 may be vibrating devices capable of vibrating the display panel 110 in the third direction (Z-axis direction). Specifically, each of the first sound generating device 210 and the second sound generating device 220 may be an exciter for vibrating the display panel 110 by generating a magnetic force using a voice coil as shown in FIGS. 8, 9, and 10. However, the disclosure is not limited thereto, and in some embodiments, the first sound generating device 210 and the second sound generating device 220 may be a piezoelectric element that contracts or expands in response to an applied voltage to vibrate the display panel 110. The display panel 110 may serve as a diaphragm for outputting the front left sound and the front right sound.

Although FIG. 2 illustrates that the display device 10 includes two sound generating devices 210 and 220, the number of sound generating devices 210 and 220 is not limited thereto. The first sound generating device 210 and the second sound generating device 220 will be described in detail later with reference to FIGS. 8 to 10.

The lower cover 180 may be disposed on a surface of the heat dissipation film 130. A first blocking element 201 and a second blocking element 202 may be disposed between the display panel 110 and the lower cover 180, and a third blocking element 203 and a fourth blocking element 204 may be disposed between the heat dissipation film 130 and the lower cover 180. However, the disclosure is not limited thereto.

In the display device 10, the first sound generating device 210 and the second sound generating device 220 may output sound by using the display panel 110 as a diaphragm, so that the sound may be outputted toward the front surface of the display device 10, which makes it possible to improve the sound quality. Further, due to the first sound generating device 210 and the second sound generating device 220, a separate speaker disposed on the bottom surface or a side of the conventional display panel may be omitted.

Although FIGS. 1 and 2 illustrate that the display device 10 according to an embodiment is a medium-large display device including multiple source driving circuits 121, the disclosure is not limited thereto. For example, the display device 10 according to an embodiment may be a small display device including one source driving circuit 121. The flexible films 122, the source circuit boards 140, and the cables 150 may be omitted. Further, the source driving circuit 121 and the timing control circuit 170 may be integrated into one integrated circuit and adhered to one flexible circuit board, or may be adhered to the first substrate 111 of the display panel 110. The medium-large display device may be a monitor, a TV, or the like, and the small display device may be a smartphone, a tablet PC, or the like.

Figure 6:
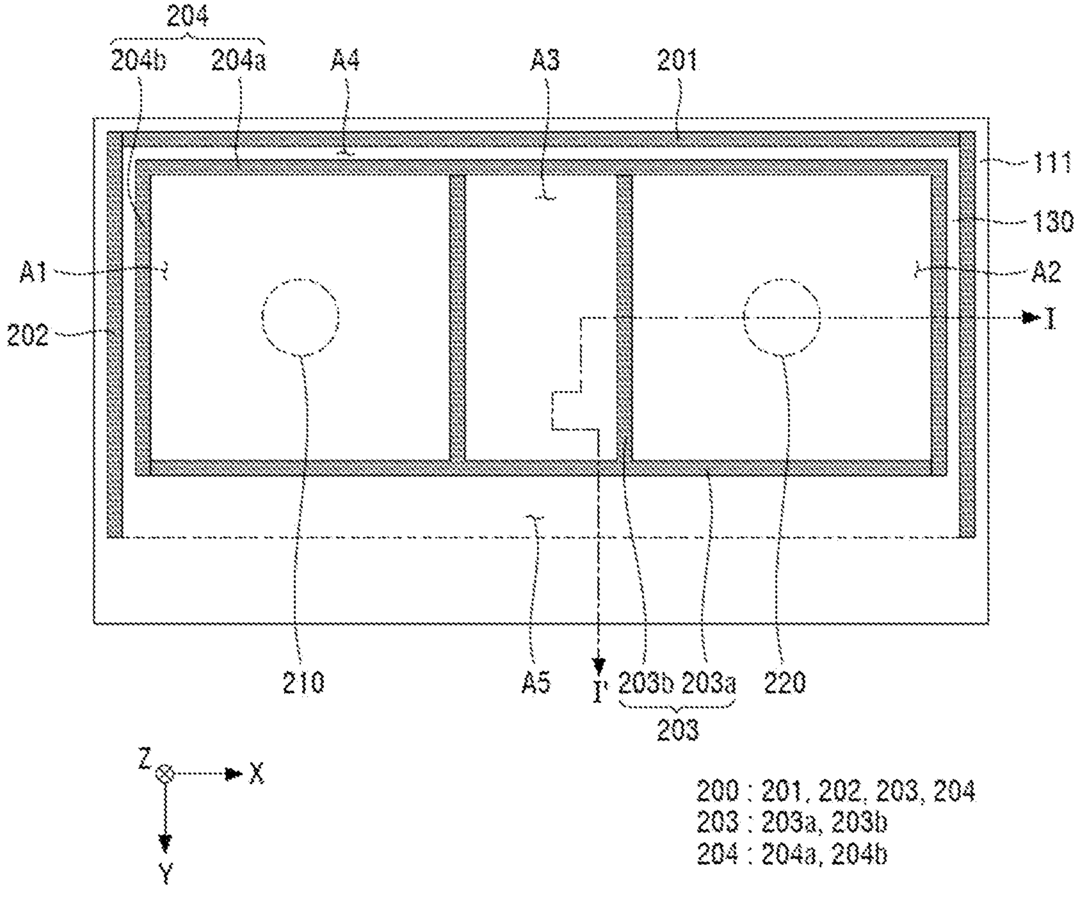
FIG. 6 is a schematic bottom view illustrating the blocking element and the sound generating devices of the display device of FIG. 3 according to an embodiment.

FIG. 6 is a schematic bottom view illustrating the blocking element and the sound generating devices of the display device of FIG. 3 according to an embodiment. For simplicity of description, FIG. 6 illustrates only the first substrate 111, the heat dissipation film 130, the blocking element 200, the first sound generating device 210, and the second sound generating devices 220 of the display panel 110. For example, in FIG. 6, the source driving circuits 121, the flexible films 122, the source circuit boards 140, the cables 150, the control circuit board 160, the timing control circuit 170, and the lower cover 180 are omitted.

Referring further to FIG. 6 in addition to FIG. 5, the size of the heat dissipation film 130 may be smaller than the size of the first substrate 111, so that the four edges of a surface of the first substrate 111 may be exposed without being covered by the heat dissipation film 130.

The blocking element 200 may include the first blocking element 201, the second blocking element 202, the third blocking element 203, and the fourth blocking element 204.

The first blocking element 201, the second blocking element 202, the third blocking element 203, and the fourth blocking element 204 may serve to block the propagation of vibration of the display panel 110 generated by the sound generating devices 210 and 220 or the transmission of sound generated by the vibration of the display panel 110.

The first blocking element 201 may be disposed at an edge of the first substrate 111. For example, the first blocking element 201 may be disposed at the upper edge of the first substrate 111 while extending along the X-axis direction. The second blocking element 202 may extend in the Y-axis direction, and may be disposed at two edges of the first substrate 111. Further, an end of the second blocking element 202 may be in contact (physical contact) with an end of the first blocking element 201. In other words, the end of the second blocking element 202 positioned at the upper edge of the first substrate 111 may be in contact with the end of the first blocking element 201 at a corner of the first substrate 111.

The third blocking element 203 may include a first portion 203*a* and a second portion 203*b*. Specifically, the first portion 203*a* of the third blocking element 203 may extend along the X-axis direction, and may be disposed adjacent to the lower edge of the heat dissipation film 130. The second portion 203*b* of the third blocking element 203 may extend along the Y-axis direction from the central portion of the third blocking element 203, and may be disposed at the central portion of the heat dissipation film 130 to be positioned adjacent to the first sound generating device 210 and the second sound generating device 220.

The fourth blocking element 204 may include a first portion 204*a* and a second portion 204*b*. Specifically, the first portion 204*a* of the fourth blocking element 204 may extend along the X-axis direction, and may be positioned between the first blocking element 201 and the second portion 203*b* of the third blocking element 203. For example, the first portion 204*a* of the fourth blocking element 204 may be positioned between the first blocking element 201 and the second portion 203*b* of the third blocking element 203, and may be disposed adjacent to the upper edge of the heat dissipation film 130. Further, the second portion 204*b* of the fourth blocking element 204 may extend in the Y-axis direction from the end of the first portion 204*a* of the fourth blocking element 204, and may be disposed adjacent to the second blocking element 202.

The second portion 204*b* of the fourth blocking element 204 may extend in the Y-axis direction from the end of the first portion 204*a* of the fourth blocking element 204, and may be in contact with the end of the first portion 203*a* of the third blocking element 203. Further, the central portion of the first portion 204*a* of the fourth blocking element 204 may be in contact with the second portion 203*b* of the third blocking element 203 extending in the Y-axis direction from the central portion of the first portion 203*a* of the third blocking element 203.

Referring to FIG. 6, a surface of the heat dissipation film 130 may be divided into a first area A1, a second area A2, a third area A3, a fourth area A4, and a fifth area A5 by the blocking elements 201, 202, 203, and 204 as shown in FIG. 6.

The first area A1, which may be an area in which the first sound generating device 210 is disposed, may be defined by the first portion 203*a* of the third blocking element 203, the second portion 203*b* of the third blocking element 203, the first portion 204*a* of the fourth blocking element 204, and the second portion 204*b* of the fourth blocking element 204 that are disposed to surround the first sound generating device 210. Accordingly, the propagation of vibration or sound of the display panel 110 generated by the first sound generating device 210 of the first area A1 to the second area A2, the third area A3, the fourth area A4, and the fifth area A5 may be prevented or suppressed.

The second area A2, which may be an area in which the second sound generating device 220 is disposed, may be defined by the first portion 203*a* of the third blocking element 203, the second portion 203*b* of the third blocking element 203, the first portion 204*a* of the fourth blocking element 204, and the second portion 204*b* of the fourth blocking element 204 that are disposed to surround the second sound generating device 220. Accordingly, the propagation of vibration or sound of the display panel 110 generated by the second sound generating device 220 of the second area A2 to the first area A1, the third area A3, the fourth area A4, and the fifth area A5 may be prevented or suppressed. In an embodiment, the size of the second area A2 may be substantially the same as the size of the first area A1. However, the disclosure is not limited thereto. Since each of the first area A1 and the second area A2 defines an air gap space sealed on all sides, it may be possible to secure a space where the first sound generating device 210 and the second sound generating device 220 may vibrate. For example, the first area A1 and the second area A2 may be sound areas.

The third area A3 may be an area between the first area A1 and the second area A2. The sound generating devices may not be disposed in the third area A3. The distance between the first area A1 and the second area A2 may increase due to the third area A3. Accordingly, the influence of the vibration of the display panel 110 generated by the first sound generating device 210 of the first area A1 on the vibration of the display panel 110 generated by the second sound generating device 220 of the second area A2 may be prevented or suppressed. Further, the influence of the vibration of the display panel 110 generated by the second sound generating device 220 of the second area A2 on the vibration of the display panel 110 generated by the first sound generating device 210 of the first area A1 may be prevented or suppressed.

The fourth area A4 may be defined by the first blocking element 201, the second blocking element 202, the first portion 204*a* of the fourth blocking element 204, and the second portion 204*b* of the fourth blocking element 204, and the sound generating devices may not be disposed in the fourth area A4. Specifically, the fourth area A4 may be an area between the first blocking element 201 and the first portion 204*a* of the fourth blocking element 204 and between the second blocking element 202 and the second portion 204*b* of the fourth blocking element 204.

The fourth area A4 may surround the side surfaces of the first area A1, the second area A2, and the third area A3 except the lower side surfaces of the first area A1, the second area A2, and the third area A3 positioned at the lower edge of the heat dissipation film 130. For example, the fourth area A4 may surround the side surfaces of the first area A1, the second area A2, and the third area A3 positioned at the upper edge and both side edges of the heat dissipation film 130. Accordingly, the fourth area A4 may prevent the sound generated by the first sound generating device 210 and the second sound generating device 220 in the first area A1 and the second area A2 from leaking to the outside.

The fifth area A5 may be an area between the lower edge of the heat dissipation film 130 and the first portion 203*a* of the third blocking element 203. The fifth area A5, which may be a circuit area in which the source circuit boards 140 are disposed, may be separated from the first area A1 and the second area A2 where the first sound generating device 210 and the second sound generating device 220 are disposed, respectively, by the first portion 203*a* of the third blocking element 203 disposed at a side of the first area A1, the second area A2, and the third area A3. For example, since the air gap space is divided by the first portion 203*a* of the third blocking element 203 into the first area A1 and the second area A2 that are the sound areas, and the fifth area A5 that is the circuit area, it may be possible to prevent or suppress the vibration generated by the first sound generating device 210 and the second sound generating device 220 from being transmitted to the source circuit boards 140, the source driving circuits 121, the flexible film 122, or the like. The size of the fifth area A5 may vary depending on the sizes of the circuit boards disposed in the fifth area A5 that is the circuit area. In case that the circuit is not disposed on the heat dissipation film 130, the fifth area A5 may be omitted.

FIG. 7 is a schematic cross-sectional view illustrating an example of a display area of a display panel.

Referring to FIG. 7, the display panel 110 may include the first substrate 111, the second substrate 112, the thin film transistor layer TFTL, the light emitting element layer EML, the filler FL, the wavelength conversion layer QDL, and the color filter layer CFL.

A buffer layer 302 may be formed on a surface of the first substrate 111 facing the second substrate 112. The buffer layer 302 may be formed on the first substrate 111 to protect thin film transistors 335 and light emitting elements from moisture permeating through the first substrate 111 susceptible to moisture permeation. The buffer layer 302 may be formed of multiple inorganic layers that are alternately stacked on each other. For example, the buffer layer 302 may be formed of a multilayer in which one or more inorganic layers of a silicon oxide (SiOx) layer, a silicon nitride (SiNx) layer and a silicon oxynitride (SiON) layer are alternately stacked on each other. The buffer film may be omitted.

The thin film transistor layer TFTL may be formed on the buffer layer 302. The thin film transistor layer TFTL may include the thin film transistors 335, a gate insulating layer 336, an interlayer insulating layer 337, a passivation layer 338, and a planarization layer 339.

The thin film transistor 335 may be formed on the buffer layer 302. The thin film transistor 335 may include an active layer 331, a gate electrode 332, a source electrode 333, and a drain electrode 334. Although FIG. 7 illustrates that the thin film transistor 335 is formed in a top gate structure in which the gate electrode 332 is positioned above the active layer 331, the disclosure is not limited thereto. For example, the thin film transistors 335 may be formed in a bottom gate structure in which the gate electrode 332 is positioned under the active layer 331 or in a double gate structure in which the gate electrode 332 is positioned above and under the active layer 331.

The active layer 331 may be formed on the buffer layer 302. The active layer 331 may be formed of a silicon-based semiconductor material or an oxide-based semiconductor material. A light shielding layer for shielding external light incident on the active layer 331 may be formed between the buffer film and the active layer 331.

The gate insulating layer 336 may be formed on the active layer 331. The gate insulating layer 336 may be formed of an inorganic layer such as a silicon oxide (SiOx) layer and a silicon nitride (SiNx) layer, or a multilayer thereof.

The gate electrode 332 and a gate line may be formed on the gate insulating layer 336. The gate electrode 332 and the gate line may be formed as a single layer or multiple layers made of at least one of molybdenum (Mo), aluminum (Al), chromium (Cr), gold (Au), titanium (Ti), nickel (Ni), neodymium (Nd) and copper (Cu) or an alloy thereof.

The interlayer insulating layer 337 may be formed on the gate electrode 332 and the gate line. The interlayer insulating layer 337 may be formed of an inorganic layer such as a silicon oxide (SiOx) layer and a silicon nitride (SiNx) layer, or a multilayer thereof.

The source electrode 333, the drain electrode 334 and a data line may be formed on the interlayer insulating layer 337. Each of the source electrode 333 and the drain electrode 334 may be connected to the active layer 331 through a contact hole penetrating the gate insulating layer 336 and the interlayer insulating layer 337. The source electrode 333, the drain electrode 334 and the data line may be formed as a single layer or multiple layers made of at least one of molybdenum (Mo), aluminum (Al), chromium (Cr), gold (Au), titanium (Ti), nickel (Ni), neodymium (Nd) and copper (Cu) or an alloy thereof.

The passivation layer 338 for insulating the thin film transistor 335 may be formed on the source electrode 333, the drain electrode 334 and the data line. The passivation layer 338 may be formed of an inorganic layer such as a silicon oxide (SiOx) layer and a silicon nitride (SiNx) layer, or a multilayer thereof.

The planarization layer 339 may be formed on the passivation layer 338 to flatten a step due to the thin film transistors 335. The planarization layer 339 may be formed of an organic film such as acryl resin, epoxy resin, phenolic resin, polyamide resin, polyimide resin and/or the like.

The light emitting element layer EML may be formed on the thin film transistor layer TFTL. The light emitting element layer EML includes light emitting elements and a pixel defining layer 344.

The light emitting elements and the pixel defining layer 344 may be formed on the planarization layer 339. The light emitting element may be an organic light emitting element. The light emitting element may include an anode electrode 341, light emitting layers 342 and a cathode electrode 343.

The anode electrode 341 may be formed on the planarization layer 339. The anode electrode 341 may be connected to the source electrode 333 of the thin film transistor 335 via the contact hole passing through the passivation layer 338 and the planarization layer 339.

The pixel defining layer 344 may be formed to cover the edge of the anode electrode 341 on the planarization layer 339 to partition pixels. For example, the pixel defining layer 344 may serve as a pixel defining layer defining the sub-pixels PX1, PX2, and PX3. Each of the sub-pixels PX1, PX2, and PX3 may represent an area in which an anode electrode 341, a light emitting layer 342, and a cathode electrode 343 are sequentially stacked on each other and holes from the anode electrode 341 and electrons from the cathode electrode 343 are combined with each other in the light emitting layer 342 to emit light.

The light emitting layer 342 may be formed on the anode electrode 341 and the pixel defining layer 344. In some embodiments, the light emitting layer 342 may be an organic light emitting layer. The light emitting layer 342 may emit short-wavelength light, such as blue light or ultraviolet light. The peak wavelength range of the blue light may be about 450 nm to about 490 nm, and the peak wavelength range of the ultraviolet light may be less than 450 nm. The light emitting layer 342 may be a common layer commonly formed in the sub-pixels PX1, PX2, and PX3. The display panel 110 may include the wavelength conversion layer QDL for converting the short-wavelength light, such as blue light or ultraviolet light, into red light, green light, and blue light, and the color filter layer CFL for selectively transmitting the red light, the green light, and the blue light. The light emitting layer 342 may be formed in a tandem structure of two or more stacks, e.g., a tandem structure of three stacks in which three blue light emitting layers are disposed to overlap. A charge generation layer may be further disposed between the stacks.

However, the disclosure is not limited to the above-described example. In some other embodiments, the light emitting layer 342 may contain a quantum dot material. The core of the quantum dot may be selected from a group II-VI compound, a group III-V compound, a group IV-VI compound, a group IV element, a group IV compound, and a combination thereof.

The group II-VI compound may be selected from the group consisting of binary compounds, ternary compounds, and quaternary compounds, wherein the binary compounds are selected from the group consisting of CdSe, CdTe, ZnS, ZnSe, ZnTe, ZnO, HgS, HgSe, HgTe, MgSe, MgS and mixtures thereof, the ternary compounds are selected from the group consisting of AgInS, CuInS, CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS and mixtures thereof, and the quaternary compounds are selected from the group consisting of HgZnTeS, CdZnSeS, CdZnSeTe, CdZnSTe, CdHgSeS, CdHgSeTe, CdHgSTe, HgZnSeS, HgZnSeTe, HgZnSTe and mixtures thereof.

The group III-V compound may be selected from the group consisting of binary compounds, ternary compounds, and quaternary compounds, wherein the binary compounds are selected from the group consisting of GaN, GaP, GaAs, GaSb, AN, AlP, AlAs, AlSb, InN, InP, InAs, InSb and mixtures thereof, the ternary compounds are selected from the group consisting of GaNP, GaNAs, GaNSb, GaPAs, GaPSb, AlNP, AlNAs, AlNSb, AlPAs, AlPSb, InGaP, InNP, InNAs, InNSb, InPAs, InPSb, GaAlNP and mixtures thereof, and the quaternary compounds are selected from the group consisting of GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb and mixtures thereof.

The group IV-VI compound may be selected from the group consisting of binary compounds, ternary compounds, and quaternary compounds, wherein the binary compounds are selected from the group consisting of SnS, SnSe, SnTe, PbS, PbSe, PbTe and mixtures thereof, the ternary compounds are selected from the group consisting of SnSeS, SnSeTe, SnSTe, PbSeS, PbSeTe, PbSTe, SnPbS, SnPbSe, SnPbTe and mixtures thereof, and the quaternary compounds are selected from the group consisting of SnPbSSe, SnPbSeTe, SnPbSTe and mixtures thereof. The group IV element may be selected from the group consisting of Si, Ge and mixtures thereof. The group IV compound may be a binary compound selected from the group consisting of SiC, SiGe and mixtures thereof.

The binary compound, the tertiary compound or the quaternary compound may exist in particles at a uniform concentration, or may exist in the same particle divided into states where concentration distributions are partially different. Further, the particles may have a core/shell structure in which one quantum dot surrounds another quantum dot. An interface between the core and the shell may have a concentration gradient in which the concentration of elements in the shell decreases toward the center.

In some embodiments, the quantum dot may have a core-shell structure including a core including the nanocrystal described above and a shell surrounding the core. The shell of the quantum dot may serve as a protective layer for maintaining semiconductor characteristics by preventing chemical denaturation of the core and/or as a charging layer for giving electrophoretic characteristics to the quantum dot. The shell may be a single layer or a multilayer. An interface between the core and the shell may have a concentration gradient in which the concentration of elements in the shell decreases toward the center. Examples of the shell of the quantum dot may include a metal or non-metal oxide, a semiconductor compound, and a combination thereof.

For example, the metal or non-metal oxide may be a binary compound such as $SiO_2$, $Al_2O_3$, $TiO_2$, ZnO, MnO, $Mn_2O_3$, $Mn_3O_4$, CuO, FeO, $Fe_2O_3$, $Fe_3O_4$, CoO, $Co_3O_4$ and NiO, or a tertiary compound such as $MgAl_2O_4$, $CoFe_2O_4$, $NiFe_2O_4$ and $CoMn_2O_4$, but the disclosure is not limited thereto.

The semiconductor compound may be, for example, CdS, CdSe, CdTe, ZnS, ZnSe, ZnTe, ZnSeS, ZnTeS, GaAs, GaP, GaSb, HgS, HgSe, HgTe, InAs, InP, InGaP, InSb, AlAs, AlP, AlSb and/or the like, but the disclosure is not limited thereto.

The quantum dot may have a full width at half maximum (FWHM) of an emission wavelength spectrum of about 45 nm or less, in an embodiment about 40 nm or less, in another embodiment about 30 nm or less, and color purity or color reproducibility may be improved in this range. Further, the light emitted through the quantum dot may be emitted in all directions, so that a wide viewing angle may be improved.

Further, the type of the quantum dot is not particularly limited to one commonly used in the art, but more specifically, the quantum dot may have a spherical shape, a pyramidal shape, a multi-arm shape, or may be a cubic nanoparticle, a nanotube, a nanowire, a nanofiber, a nanoplate particle, or the like.

The quantum dot may control the color of emitted light depending on a particle size, so that the quantum dot may have various emission colors such as blue, red, and green.

In case that the light emitting layer 342 includes a quantum dot material, the wavelength conversion layer QDL may be omitted.

A hole transporting layer and an electron transporting layer as well as the light emitting layer 342 may be further positioned between the cathode electrode 343 and the anode electrode 341.

Hereinafter, a case in which the light emitting layer 342 is formed of an organic light emitting layer will be described as an example.

The cathode electrode 343 may be formed on the light emitting layer 342. The cathode electrode 343 may be formed to cover the light emitting layer 342. The second electrode 343 may be a common layer formed commonly to the pixels.

In some embodiments, the light emitting element layer EML may be formed in a top emission structure in which light is emitted toward the second substrate 112, i.e., in an upward direction. The anode electrode 341 may be formed of a metal material, having high reflectivity, such as a stacked structure (Ti/Al/Ti) of aluminum (Al) and titanium (Ti), a stacked structure (ITO/Al/ITO) of Al and ITO, an APC alloy, a stacked structure (ITO/APC/ITO) of an APC alloy and ITO, and/or the like. The APC alloy may be an alloy of silver (Ag), palladium (Pd) and copper (Cu). Further, the cathode electrode 263 may be formed of a transparent conductive material (TCO) such as ITO or IZO that can transmit light or a semi-transmissive conductive material such as magnesium (Mg), silver (Ag), or an alloy of magnesium (Mg) and silver (Ag). In the case where the cathode electrode 343 is formed of a semi-transmissive conductive material, the light emission efficiency may be increased due to a micro-cavity effect. However, the disclosure is not limited to the above-described example, and in some other embodiments, the light emitting element layer EML may be formed in a bottom emission structure. The cathode electrode 343 may include a metal material having high reflectivity, and the anode electrode 341 may be made of a transparent conductive material or a semi-transmissive conductive material capable of transmitting light. Hereinafter, for simplicity of description, a case in which the light emitting element layer EML has a top emission structure will be described as an example.

An encapsulation layer 345 may be formed on the light emitting element layer EML. The encapsulation layer 345 may serve to prevent oxygen or moisture from permeating into the light emitting layer 342 and the cathode electrode 343. To this end, the encapsulation layer 345 may include at least one inorganic layer. The inorganic layer may be formed of silicon nitride, aluminum nitride, zirconium nitride, titanium nitride, hafnium nitride, tantalum nitride, silicon oxide, aluminum oxide, and/or titanium oxide. The encapsulation layer 345 may further include at least one organic layer. The organic layer may be formed to have a sufficient thickness to prevent particles from entering the light emitting layer 342 and the cathode electrode 343 through the encapsulation layer 345. The organic layer may include at least one of epoxy, acrylate, and urethane acrylate. In some embodiments, the encapsulation layer 345 may include two inorganic layers and an organic layer positioned between the two inorganic layers.

The color filter layer CFL may be disposed on a surface of the second substrate 112 facing the first substrate 111. The color filter layer CFL may include a black matrix 360 and color filters 370.

A black matrix 360 may be formed on a surface of the second substrate 112. The black matrix 360 may be disposed to overlap the pixel defining layer 344 without overlapping the sub-pixels PX1, PX2, and PX3. The black matrix 360 may include a black dye capable of blocking light without transmitting it or may include an opaque metal material.

The color filters 370 may be disposed to overlap the sub-pixels PX1, PX2, and PX3. The first color filters 371 may be disposed to overlap the first sub-pixels PX1, respectively, the second color filters 372 may be disposed to overlap the second sub-pixels PX2, respectively, and the third color filter 373 may be disposed to overlap the third sub-pixels PX3, respectively. The first color filter 371 may be a first color light transmissive filter that transmits light of a first color, the second color filter 372 may be a second color light transmissive filter that transmits light of a second color, and a third color filter 373 may be a third color light transmissive filter that transmits light of the third color. By way of non-limiting example, the first color may be red, the second color may be green, and the third color may be blue, but they are not limited thereto. Red light having passed through the first color filter 371 may have a peak wavelength in a range of about 620 to about 750 nm, green light having passed through the second color filter 372 may have a peak wavelength in a range of about 500 to about 570 nm, and blue light having passed through the third color filter 373 may have a peak wavelength in a range of about 450 to about 490 nm.

Further, the edges of two color filters adjacent to each other may overlap the black matrix 360. Therefore, the black matrix 360 may prevent color mixing caused in case that the light emitted from the light emitting layer 342 of one sub-pixel travels to the color filter of the adjacent sub-pixel.

An overcoat layer may be formed on the color filters 370 to flatten the stepped portion formed by the color filters 370 and the black matrix 360. The overcoat layer may be omitted.

The wavelength conversion layer QDL may be disposed on the color filter layer CFL. The wavelength conversion layer QDL may include a first capping layer 351, a first wavelength conversion layer 352, a second wavelength conversion layer 353, a third wavelength conversion layer 354, a second capping layer 355, an interlayer organic layer 356, and a third capping layer 357.

The first capping layer 351 may be disposed on the color filter layer CFL. The first capping layer 351 may serve to prevent moisture or oxygen from the outside from permeating into the first wavelength conversion layer 352, the second wavelength conversion layer 353, and the third wavelength conversion layer 354 through the color filter layer CFL. The first capping layer 351 may be formed of an inorganic layer, for example, silicon nitride, aluminum nitride, zirconium nitride, titanium nitride, hafnium nitride, tantalum nitride, silicon oxide, aluminum oxide, and/or titanium oxide.

The first wavelength conversion layer 352, the second wavelength conversion layer 353, and the third wavelength conversion layer 354 may be disposed on the first capping layer 351.

The first wavelength conversion layer 352 may be disposed to overlap the first sub-pixel PX1. The first wavelength conversion layer 352 may convert the short-wavelength light, such as blue light or ultraviolet light, emitted from the light emitting layer 342 of the first sub-pixel PX1 into light of the first color. To this end, the first wavelength conversion layer 352 may include a first base resin, a first wavelength shifter, and a first scatterer.

The first base resin may be a material having high light transmittance and excellent dispersion characteristics for the first wavelength shifter and the first scatterer. For example, the first base resin may include an organic material such as epoxy resin, acrylic resin, cardo resin, and/or imide resin.

The first wavelength shifter may convert or shift the wavelength range of incident light. The first wavelength shifter may be a quantum dot, a quantum rod, and/or a phosphor. In case that the first wavelength shifter is a quantum dot, which is a semiconductor nanocrystal material, it may have a specific band gap depending on the composition and size thereof. Therefore, the first wavelength shifter may absorb incident light and emit light having a predetermined or given wavelength. Further, the first wavelength shifter may have a core-shell structure including a core containing the aforementioned nanocrystal and a shell surrounding the core. Examples of nanocrystal constituting the core may include group IV nanocrystal, group II-VI compound nanocrystal, group III-V compound nanocrystal, group IV-VI nanocrystal, a combination thereof, or the like. The shell may serve as a passivation layer preventing chemical modification of the core to maintain semiconductor characteristics and/or as a charging layer for imparting electrophoretic characteristics to the quantum dot. Further, the shell may be a single layer or multiple layers, and examples of the shell may include a metal or non-metal oxide, a semiconductor compound, or a combination thereof.

The first scatterer may have a refractive index different from that of the first base resin and form an optical interface with the first base resin. For example, the first scatterer may be light scattering particles. For example, the first scatterer may be a metal oxide particle such as titanium oxide ($TiO_2$), silicon oxide ($SiO_2$), zirconium oxide ($ZrO_2$), aluminum oxide ($Al_2O_3$), indium oxide ($In_2O_3$), zinc oxide (ZnO), tin oxide ($SnO_2$), and/or the like. In other embodiments, the first scatterer may be an organic particle such as acrylic resin or urethane resin.

The first scatterer may scatter incident light in random directions without any substantial change of the wavelength of the light transmitting the first wavelength conversion layer 352. Accordingly, the path length of the light transmitting the first wavelength conversion layer 352 may be increased, which makes it possible to increase the color conversion efficiency by the first wavelength shifter.

Further, the first wavelength conversion layer 352 may overlap the first color filter 371. Therefore, some of the short-wavelength light, such as blue light or ultraviolet light, provided from the first sub-pixel PX1 may transmit the first wavelength conversion layer 352 without being converted into light of the first color by the first wavelength shifter. However, the short-wavelength light, such as blue light or ultraviolet light, which is incident on the first color filter 371 without being converted by the first wavelength conversion layer 352, may not transmit the first color filter 371. In contrast, the light of the first color, which is converted by the first wavelength conversion layer 352, may be emitted toward the second substrate 112 while transmitting the first color filter 371.

The second wavelength conversion layer 353 may be disposed to overlap the second sub-pixel PX2. The second wavelength conversion layer 353 may convert the short-wavelength light, such as blue light or ultraviolet light, emitted from the light emitting layer 342 of the second sub-pixel PX2 into light of the second color. To this end, the second wavelength conversion layer 353 may include a second base resin, a second wavelength shifter, and a second scatterer. Since the second base resin, the second wavelength shifter, and the second scatterer of the second wavelength conversion layer 353 may be substantially the same as those of the first wavelength conversion layer 352, detailed description thereof will be omitted. However, in case that the first wavelength shifter and the second wavelength shifter are quantum dots, the diameter of the second wavelength shifter may be smaller than the diameter of the first shifter.

Further, the second wavelength conversion layer 353 may overlap the second color filter 372. Therefore, some of the short-wavelength light, such as blue light or ultraviolet light, provided from the second sub-pixel PX2 may transmit the second wavelength conversion layer 353 without being converted into light of the second color by the second wavelength shifter. However, the short-wavelength light, such as blue light or ultraviolet light, which is incident on the second color filter 372 without being converted by the second wavelength conversion layer 353, may not transmit the second color filter 372. In contrast, the light of the second color, which is converted by the second wavelength conversion layer 353, may be emitted toward the second substrate 112 while transmitting the second color filter 372.

The third wavelength conversion layer 354 may be disposed to overlap the third sub-pixel PX3. The third wavelength conversion layer 354 may convert the short-wavelength light, such as blue light or ultraviolet light, emitted from the light emitting layer 342 of the third sub-pixel PX3 into light of the third color. To this end, the third wavelength conversion layer 354 may include a third base resin and a third scatterer. Since the third base resin and the third scatterer of the third wavelength conversion layer 354 may be substantially the same as those of the first wavelength conversion layer 352, detailed description thereof will be omitted.

Further, the third wavelength conversion layer 354 may overlap the third color filter 373. In case that the light provided from the third sub-pixel PX3 is blue light, the blue light provided from the third sub-pixel PX3 may transmit the third wavelength conversion layer 354 without being converted by the third wavelength conversion layer 354, and the light that has transmitted the third wavelength conversion layer 353 may be emitted toward the second substrate 112 while transmitting the third color filter 373. For example, in case that the light provided from the third sub-pixel PX3 is blue light, the third wavelength conversion layer 354 may not include a separate wavelength shifter.

The second capping layer 355 may be disposed on the first wavelength conversion layer 352, the second wavelength conversion layer 353, the third wavelength conversion layer 354, and the first capping layer 351 that is exposed without being covered by the wavelength conversion layers 352, 353, and 354. The second capping layer 355 may serve to prevent moisture or oxygen from the outside from permeating into the first wavelength conversion layer 352, the second wavelength conversion layer 353, and the third wavelength conversion layer 354. The second capping layer 355 may be formed of an inorganic layer, for example, silicon nitride, aluminum nitride, zirconium nitride, titanium nitride, hafnium nitride, tantalum nitride, silicon oxide, aluminum oxide, and/or titanium oxide.

The interlayer organic layer 356 may be disposed on the second capping layer 355. The interlayer organic layer 356 may be a planarization layer for flattening the stepped portion formed by the wavelength conversion layers 352, 353, and 354. The interlayer organic layer 356 may be formed of an organic layer such as acryl resin, epoxy resin, phenolic resin, polyamide resin, polyimide resin and/or the like.

The third capping layer 357 may be disposed on the interlayer organic layer 356. The third capping layer 357 may be formed of an inorganic layer, for example, silicon nitride, aluminum nitride, zirconium nitride, titanium nitride, hafnium nitride, tantalum nitride, silicon oxide, aluminum oxide, and/or titanium oxide.

The filler FL may be disposed between the thin film encapsulation layer disposed on the first substrate 111 and the third capping layer 357 disposed on the second substrate 112. The filler FL may be made of a material having a buffering function. For example, the filler FL may be formed of an organic material such as acryl resin, epoxy resin, phenolic resin, polyamide resin, polyimide resin and/or the like.

Further, a sealing material bonding the first substrate 111 and the second substrate 112 may be disposed in the non-display area of the display panel 110, and the filler FL may be surrounded by the sealing material in plan view. The sealing material may be a glass frit or a sealant.

In accordance with the embodiment shown in FIG. 7, the first to third sub-pixels PX1, PX2, and PX3 emit the short-wavelength light, such as blue light or ultraviolet light, the light of the first sub-pixel PX1 may be converted into the light of the first color by the first wavelength conversion layer 352 and outputted through the first color filter 371, the light of the second sub-pixel PX2 may be converted into the light of the second color by the second wavelength conversion layer 353 and outputted through the second color filter 372, and the light of the third sub-pixel PX3 may be outputted through the third wavelength conversion layer 354 and the third color filter 373, which may make it possible to output white light.

Further, in accordance with the embodiment shown in FIG. 7, the sub-pixels PX1, PX2, and PX3 may be formed in the top emission structure in which the light is emitted toward the second substrate 112, i.e., in the upward direction, so that the heat dissipation film 130 containing an opaque material such as graphite or aluminum may be disposed on a surface of the first substrate 111.

FIG. 8 is a schematic cross-sectional view of the first sound generating device taken along line II-II' of FIG. 3 according to an embodiment. FIGS. 9 and 10 are schematic cross-sectional views illustrating vibration of the display panel by the first sound generating device shown in FIG. 8.

Referring to FIG. 8, as described above, the first sound generating device 210 may be an exciter for vibrating the display panel 110 by generating a magnetic force using a voice coil. A hole may be formed in an area of the control circuit board 160 where the first sound generating device 210 is disposed.

The first sound generating device 210 may include a magnet 211, a bobbin 212, a voice coil 213, a damper 214, and a lower plate 215.

The magnet 211 may be a permanent magnet, and a sintered magnet such as barium ferrite may be used as the magnet. The magnet 211 may be made of ferric trioxide ($Fe_2O_3$), barium carbonate ($BaCO_3$), neodymium magnets, strontium ferrite with improved magnetic properties, an alloy-casting magnet of cobalt (Co), nickel (Ni) and/or aluminum (Al), but is not limited thereto. For example, the neodymium magnet may be neodymium-iron-boron (Nd—Fe—B).

The magnet 211 may include a plate 211*a*, a central protrusion 211*b* protruding from the center of the plate 211*a*, and a sidewall portion 211*c* protruding from the edge of the plate 211*a*. The central protrusion 211*b* and the sidewall portion 211*c* may be spaced apart from each other at a predetermined or given interval, and thus, a predetermined or given space may be formed between the central protrusion 211*b* and the sidewall portion 211*c*. For example, the magnet 211 may have a cylindrical shape, and specifically, may have a shape in which a circular space is formed on at least one bottom surface of the cylinder.

The central protrusion 211*b* of the magnet 211 may have an N polarity, and the plate 211*a* and the sidewall portion 211*c* may have an S polarity, so that an external magnetic field may be generated between the central protrusion 211*b* and the plate 211*a* of the magnet 211 and between the central protrusion 211*b* and the sidewall portion 211*c* of the magnet 211.

The bobbin 212 may be formed in a cylindrical shape. The central protrusion 211*b* of the magnet 211 may be disposed in the bobbin 212. For example, the bobbin 212 may be disposed to surround the central protrusion 211*b* of the magnet 211. Further, the sidewall portion 211*c* of the magnet 211 may be disposed outside the bobbin 212. For example, the sidewall portion 211*c* of the magnet 211 may be disposed to surround the bobbin 212. A space may be formed between the bobbin 212 and the central protrusion 211*b* of the magnet 211 and between the bobbin 212 and the sidewall portion 211*c* of the magnet 211.

The bobbin 212 may be formed of a material processed from pulp or paper, aluminum or magnesium or an alloy thereof, synthetic resin such as polypropylene, or polyamide-based fibers. An end of the bobbin 212 may be adhered to the heat dissipation film 130 using an adhesive member. The adhesive member may be a double-sided tape.

The voice coil 213 may be wound on the outer circumferential surface of the bobbin 212. An end of the voice coil 213 adjacent to an end of the bobbin 212 may receive a 1A driving voltage or a 2A driving voltage, and another end of the voice coil 213 adjacent to another end of the bobbin 212 may receive a 1B driving voltage or a 2B driving voltage. Accordingly, a current may flow through the voice coil 213 in response to the 1A driving voltage or the 2A driving voltage and the 1B driving voltage or the 2B driving voltage. An applied magnetic field may be formed around the voice coil 213 in response to the current flowing through the voice coil 213. The direction of the current flowing through the voice coil 213 in the case where the 1A driving voltage or the 2A driving voltage is a positive voltage and the 1B driving voltage or the 2B driving voltage is a negative voltage is opposite to the direction of the current flowing through the voice coil 213 in the case where the 1A driving voltage or the 2A driving voltage is a negative voltage and the 1B driving voltage or the 2B driving voltage is a positive voltage. Therefore, the N pole and the S pole of the applied magnetic field formed around the voice coil 213 may be changed by the AC driving of the 1A driving voltage or the 2A driving voltage and the 1B driving voltage or the 2B driving voltage, so that the attractive force and the repulsive force alternately act on the magnet 211 and the voice coil 213. Therefore, the bobbin 212 on which the voice coil 213 is wound may reciprocate in the third direction (Z-axis direction) as shown in FIGS. 9 and 10. Accordingly, the display panel 110 and the heat dissipation film 130 may vibrate in the third direction (Z-axis direction), thereby outputting the sound.

The damper 214 may be disposed between a part of the upper portion of the bobbin 212 and the sidewall portion 211*c* of the magnet 211. The damper 214 may adjust the vertical vibration of the bobbin 212 while contracting and expanding in response to the vertical movement of the bobbin 212. For example, since the damper 214 is connected to the bobbin 212 and the sidewall portion 211*c* of the magnet 211, the vertical movement of the bobbin 212 may be limited by the restoring force of the damper 214. For example, in case that the bobbin 212 vibrates with a predetermined or given amplitude or more, or vibrates with a predetermined or given amplitude or less, the bobbin 212 may be returned to its original position by the restoring force of the damper 214.

The lower plate 215 may be disposed on the bottom surface of the magnet 211. The lower plate 215 may be formed integrally with the magnet 211 or may be formed separately from the magnet 211. In case that the lower plate 215 is formed separately from the magnet 211, the magnet 211 may be adhered to the lower plate 215 by an adhesive member such as a double-sided tape.

The lower plate 215 may be fixed to the control circuit board 160 by a fixing member 216 such as a screw. Accordingly, the magnet 211 of the first sound generating device 210 may be fixed to the control circuit board 160.

Although an embodiment in which the magnet 211 of the first sound generating device 210 is fixed to the control circuit board 160 has been illustrated, the disclosure is not limited thereto. For example, the magnet 211 of the first sound generating device 210 may be fixed to a system circuit board, a power circuit board, or a dummy circuit board instead of the control circuit board 160. The dummy circuit board indicates a circuit board on which another circuit other than the first sound generating device 210 is not disposed. The dummy circuit board may be a flexible printed circuit board or a printed circuit board.

Although the first sound generating device 210 has been described above, the description of the first sound generating device 210 may be equally applied to the second sound generating device 220 because the second sound generating device 220 may be substantially the same as the first sound generating device 210.

Figure 11:
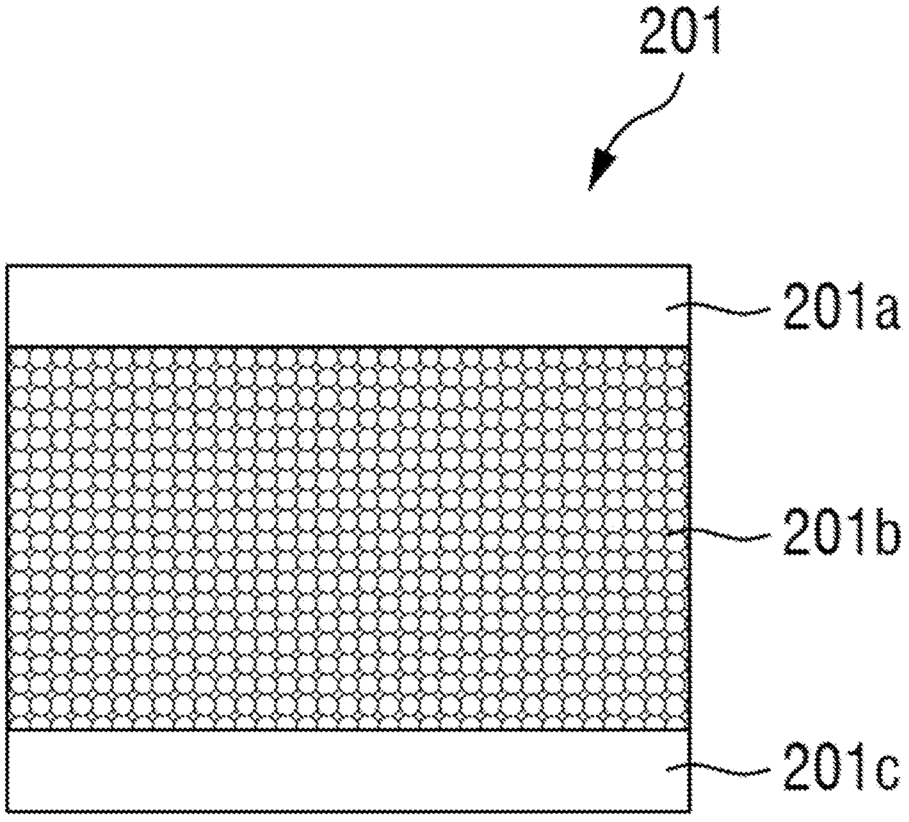
FIG. 11 is a schematic cross-sectional view of a first blocking element according to an embodiment.

FIG. 11 is a schematic cross-sectional view of a first blocking element according to an embodiment.

Referring to FIG. 11, the first blocking element 201 may include a first adhesive layer 201*a*, a first buffer layer 201*b*, and a second adhesive layer 201*c*.

The first adhesive layer 201*a* may be disposed on a surface of the first buffer layer 201*b*. As described above, the first adhesive layer 201*a* may be adhered to another surface of the first substrate 111. The first adhesive layer 201*a* may be an acrylic adhesive or a silicone adhesive, but is not limited thereto.

The first buffer layer 201*b* may be disposed on a surface of the first adhesive layer 201*a*. The buffer layer 201*b* may be formed of elastic foam. For example, the buffer layer 201*b* may be made of an elastomer resin that is at least one of polysilicon, urethane, and urethane acrylate, rubber, and aerogel. However, the disclosure is not limited thereto.

The first buffer layer 201*b* may include multiple pores. In an embodiment, the diameter of the pore may be 120 μm to 250 μm.

The second adhesive layer 201*c* may be disposed on the other surface of the first buffer layer 201*b*. The second adhesive layer 201*c* may be adhered to a surface of the lower cover 180. The second adhesive layer 201*c* may be an acrylic adhesive or a silicone adhesive, but is not limited thereto.

Although not shown in FIG. 11, the first blocking element 201 may further include a sacrificial layer (not shown). Specifically, the sacrificial layer may be disposed on a surface of the buffer layer 201*b*. The sacrificial layer may serve as a layer to be separated in case that the first blocking element 201 is incorrectly attached and needs to be detached.

Figure 12:
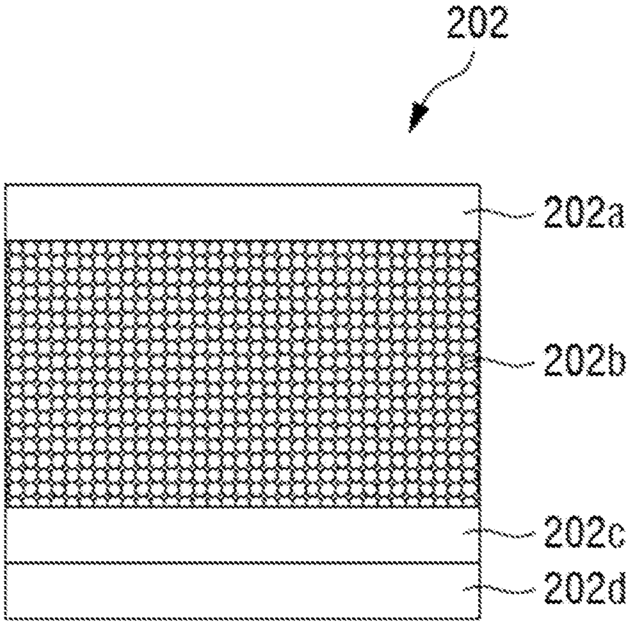
FIG. 12 is a schematic cross-sectional view of a second blocking element according to an embodiment.

FIG. 12 is a schematic cross-sectional view of a second blocking element according to an embodiment.

The second blocking element 202 may include a first adhesive layer 202*a*, a second buffer layer 202*b*, a base film 202*c*, and a second adhesive layer 202*d*.

The first adhesive layer 202*a* may be disposed on a surface of the second buffer layer 202*b*. As described above, the first adhesive layer 202*a* may be adhered to another surface of the first substrate 111. The first adhesive layer 202*a* may be an acrylic adhesive or a silicone adhesive, but is not limited thereto.

The second buffer layer 202*b* may be disposed on another surface of the first adhesive layer 202*a*. The second buffer layer 202*b* may be formed of elastic foam. For example, the second buffer layer 202*b* may be formed of polyurethane, silicone, rubber, and/or aerogel, but is not limited thereto. However, the disclosure is not limited thereto.

The second buffer layer 202*b* may include multiple pores. In an embodiment, the diameter of the pore may be 120 μm to 250 μm.

Unlike the first blocking element 201, the second blocking element 202 may further include the base film 202*c*. The base film 202*c* may be made of plastic. For example, the base film 202*c* may be polyethylene terephthalate (PET), but is not limited thereto.

The second adhesive layer 202*d* may be disposed on another surface of the base film 202*c*. The second adhesive layer 202*d* may be adhered to a surface of the lower cover 180. The second adhesive layer 202*d* may be an acrylic adhesive or a silicone adhesive, but is not limited thereto.

Although not shown in FIG. 12, in some embodiments, the second blocking element 202 may further include a sacrificial layer (not shown) disposed on a surface of the second buffer layer 202*b*, similarly to the first blocking element 201. The sacrificial layer may serve as a layer to be separated in case that the second blocking element 202 is incorrectly attached and needs to be detached.

Although the second blocking element 202 has been described in FIG. 12, in an embodiment, the third blocking element 203 and the fourth blocking element 204 may also have substantially the same cross-sectional structure as that of the second blocking element 202. Thus, the description of the cross-sectional structure of the second blocking element 202 described in conjunction with FIG. 12 may be equally applied to the third blocking element 203, and the fourth blocking element 204, so that the description thereof will be omitted.

Although there are various factors for determining acoustic characteristics of the display device 10 including the first sound generating device 210 and the second sound generating device 220, a structural element, a physical element, and an auditory element may be considered.

Specifically, they may be determined by a pore size $c_s$ in the buffer layer of the first blocking element 201 to the fourth blocking element 204 and an estimated density $\rho_s$ of the buffer layer estimated from the pore size, which are used for determining the structural element, a compression force deflection (CFD) value for determining the physical element, and a sound damping coefficient tan δ for determining the auditory element.

Therefore, in case that a sound propagation coefficient C of the buffer layers included in the first blocking element 201 to the fourth blocking element 204, which has reflected the structural element and the physical element, satisfies the following Eq. (1), the acoustic characteristics of the display device 10 may be improved.

$$1014 < C < 1565 \quad (1)$$

In the above Eq. (1), C is the sound propagation coefficient of the buffer layer included in the first to fourth blocking elements, and has a unit of cm/s. Further, the C satisfies the following Eq. (2).

$$C = \sqrt{\frac{CFD}{\rho_s}} \quad (2)$$

In the above Eq. (2), CFD is a load value received by the buffer layer included in the first to fourth blocking elements in case that the thickness of the buffer layer is compressed by 25%, and has a unit of gf/cm$^2$. The $\rho_s$ is the estimated density of the buffer layer, which is estimated from the diameter of the pore included in the buffer layer, and has a unit of g/cm$^3$. The $\rho_s$ satisfies the following Eq. (3).

$$\rho_s = \frac{328.17 - c_s}{528.81} \quad (3)$$

In the above Eq. (3), $c_s$ is the diameter of the pore included in the buffer layer, and has a unit of μm.

In case that the sound propagation coefficient C of the buffer layer included in the first blocking element 201 to the fourth blocking element 204 exceeds 1014, the pore size $c_s$ in the buffer layer of the first blocking element 201 to the fourth blocking element 204 and the estimated density $\rho_s$ of the buffer layer estimated from the pore size have numerical values for improving the acoustic characteristics of the display device 1, and in case that the sound propagation coefficient C is less than 1565, it may be possible to improve the acoustic characteristics without changing the structural and mechanical/physical characteristics of the buffer layer of the first to fourth blocking elements 201 to 204, which are determined by the pore size $c_s$ included in the buffer layer and the estimated density $\rho_s$ of the buffer layer estimated from the pore size.

Figure 13:
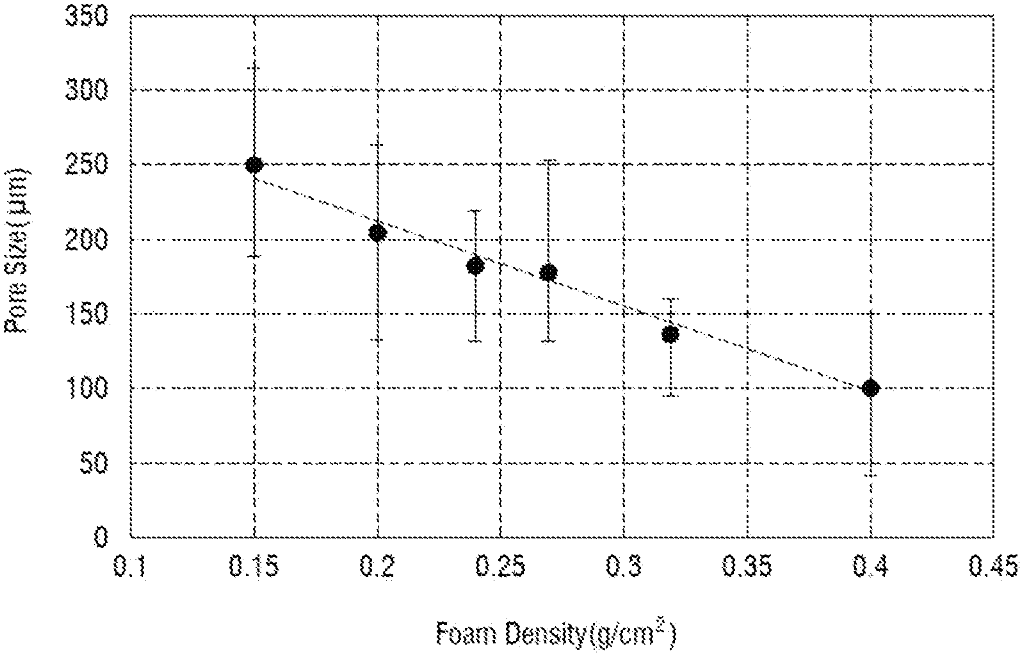
FIG. 13 is a schematic graph showing the relationship between the density of the buffer layer and the diameter of the pore included in the buffer layer.

FIG. 13 is a schematic graph showing the relationship between the density of the buffer layer and the diameter of the pore included in the buffer layer.

The Eq. (2) for calculating the sound propagation coefficient C may be derived from the following Eq. (4).

$$C^* = \sqrt{\frac{E}{\rho}} \quad (4)$$

In the above Eq. (4), C* indicates a speed of sound, and has a unit of cm/s. In addition, E indicates Young's Modulus, and ρ indicates density of air.

The speed of sound C* of the sound generated by the display device 10 is proportional to the reproducible area of the display device 1, and is dependent on the distortion rate of the sound generated by the display device 1. Further, the Young's Modulus and the density included in the above Eq. (4) are factors that have reflected the characteristics of the material. Accordingly, the Young's Modulus and the density of the buffer layer included in the first blocking element 201 to the fourth blocking element 204 disposed to surround the first sound generating device 210 and the second sound generating device 220 may affect the acoustic characteristics of the display device 1.

Specifically, the Young's Modulus is usually measured by measuring the breaking strength of a sample, but the buffer layer has a foam layer as described above, so that it is difficult to accurately measure the breaking strength of the buffer layer itself. Thus, it is reasonable to measure the breaking strength of the buffer layer itself by measuring CFD (25%). For example, the CFD (25%) value of the buffer layer may be measured using a universal testing machine (UTM) to substitute the Young's Modulus included in Eq. (4). The CFD (25%) is the load received by the buffer layer in case that it is compressed by 25% from the initial thickness thereof. The buffer layer is compressed by 25% from the initial thickness thereof because the most significant value is derived for the load value received by the buffer layer in case that it is compressed by 25% from the initial thickness thereof compared to a comparison group in which the buffer layer is compressed by a ratio other than 25%.

In an embodiment, the CFD (25%) value of the buffer layer included in the first blocking element 201, the second blocking element 202, the third blocking element 203, and the fourth blocking element 204 may be 0.35 to 0.55. In case that the CFD (25%) value of the buffer layer is 0.35 or more, the mechanical strength of the buffer layer may be sufficiently secured, so that it may be possible to prevent the deformation of the buffer layer due to an external impact and maintain the acoustic characteristics. In case that the CFD (25%) value of the buffer layer is 0.55 or less, it may be possible to improve the sound absorbing effect of the first blocking element 201, the second blocking element 202, the third blocking element 203, and the fourth blocking element 204 due to the buffer layer included in the first blocking element 201, the second blocking element 202, the third blocking element 203, and the fourth blocking element 204, and improve the balance of the sound generated by the display device 1. However, the CFD (25%) value of the buffer layer included in the first blocking element 201, the second blocking element 202, the third blocking element 203, and the fourth blocking element 204 is not limited to the above-described numerical range.

The density value of air included in Eq. (4) may be replaced by the density value of the buffer layer because the buffer layer included in the first blocking element 201 to the fourth blocking element 204 is used as a medium for the sound generated by the display device 1. Since, however, the buffer layer has a foam layer, it is difficult to accurately measure the density of the buffer layer itself similarly to the above-described Young's Modulus. Therefore, if the relationship between the density of the buffer layer and the diameter of the pore included in the buffer layer may be obtained, the density of the buffer layer may be estimated.

Referring to FIG. 13, the X-axis indicates the density of the buffer layer, and the Y-axis indicates the diameter of the pore included in the buffer layer.

Referring to the graph illustrated in FIG. 13, as the diameter of the pore decreases, the density of the buffer layer tends to increase. The dotted line illustrated in the graph of FIG. 13 is a line connecting average diameters of the pores included in the buffer layer at the density value of the buffer layer. For example, the dots illustrated in the graph of FIG. 13 mean the average diameters of the pores at the corresponding density value of the buffer layer, and the lines extending in the Y-axis with respect to the corresponding dots mean the distribution of the diameters of the pores at the corresponding density value. Therefore, the following Eq. (5) may be satisfied by deriving the dotted line connecting the average diameters of the pores included in the buffer layer at the density value of the buffer layer as a functional formula.

$$Y=-582.81X+328.17 \tag{5}$$

In the above Eq. (5), Y indicates the diameter of the pore included in the buffer layer, and has a unit of μm. In addition, X indicates the density of the buffer layer, and has a unit of $g/cm^3$.

Therefore, Eq. (3) for the pore size $c_s$ in the buffer layer and the estimated density $\rho_s$ of the buffer layer estimated from the pore size may be derived by converting the above Eq. (5) into a functional formula for the density of the buffer layer.

The buffer layers included in the first blocking element 201 to the fourth blocking element 204 may have the sound damping coefficient tan δ for determining different auditory elements for different sound ranges.

The sound damping coefficient may be measured by dynamic mechanical analysis (DMA). For example, by applying a constant stress or distortion that changes over time to the buffer layer and measuring the distortion or stress generated at that time, the dynamic sound damping coefficient of the buffer layer may be measured. Specifically, the sound damping coefficient of the buffer layer may be measured by measuring the storage modulus and the loss modulus of the buffer layer. The sound damping coefficient may be substantially the same as the sound damping coefficient tan δ of the buffer layer measured by measuring the storage modulus and the loss modulus of the buffer layer.

Specifically, the buffer layers included in the first blocking element 201 to the fourth blocking element 204 may have the sound damping coefficient value of 0.2 to 0.4 in the low-frequency sound range having a frequency of 1 Hz or more and less than 100 Hz, may have the sound damping coefficient value of 0.15 to 0.35 in the middle-frequency sound range having a frequency of 100 Hz or more and less than 1 kHz, and may have the sound damping coefficient value of 0.1 to 0.3 in the high-frequency sound range having a frequency of 1 kHz or more and less than 10 kHz. However, the sound damping coefficient value is not limited to the above-described numerical range.

When the buffer layers included in the first blocking element 201 to the fourth blocking element 204 have the above-described sound damping coefficient values, the display device 10 may have balanced sound damping coefficient values in the low, middle, and high-frequency sound ranges. For example, in case that the display device 10 has the balanced sound damping coefficient values in the low-frequency sound range, the middle-frequency sound range, and the high-frequency sound range, the display device 10 may maintain uniform sound pressure flatness in various sound ranges, which makes it possible to improve the acoustic characteristics of the display device 1.

Figure 14:
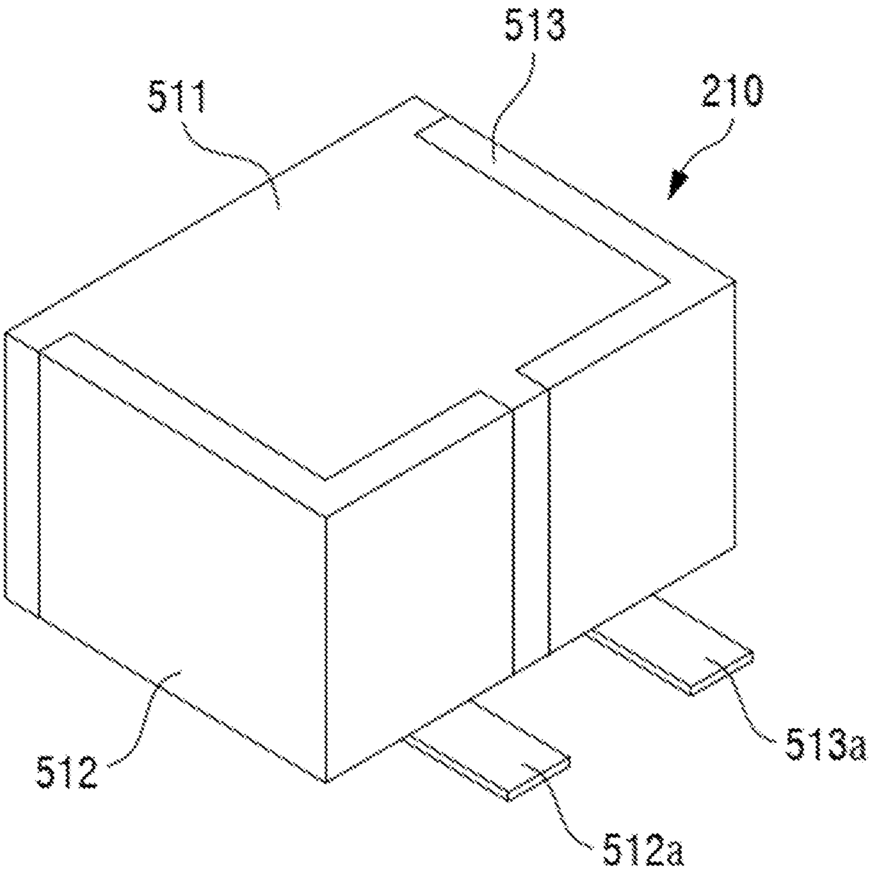
FIG. 14 is a schematic perspective view illustrating another example of the first sound generating device.
Figure 15:
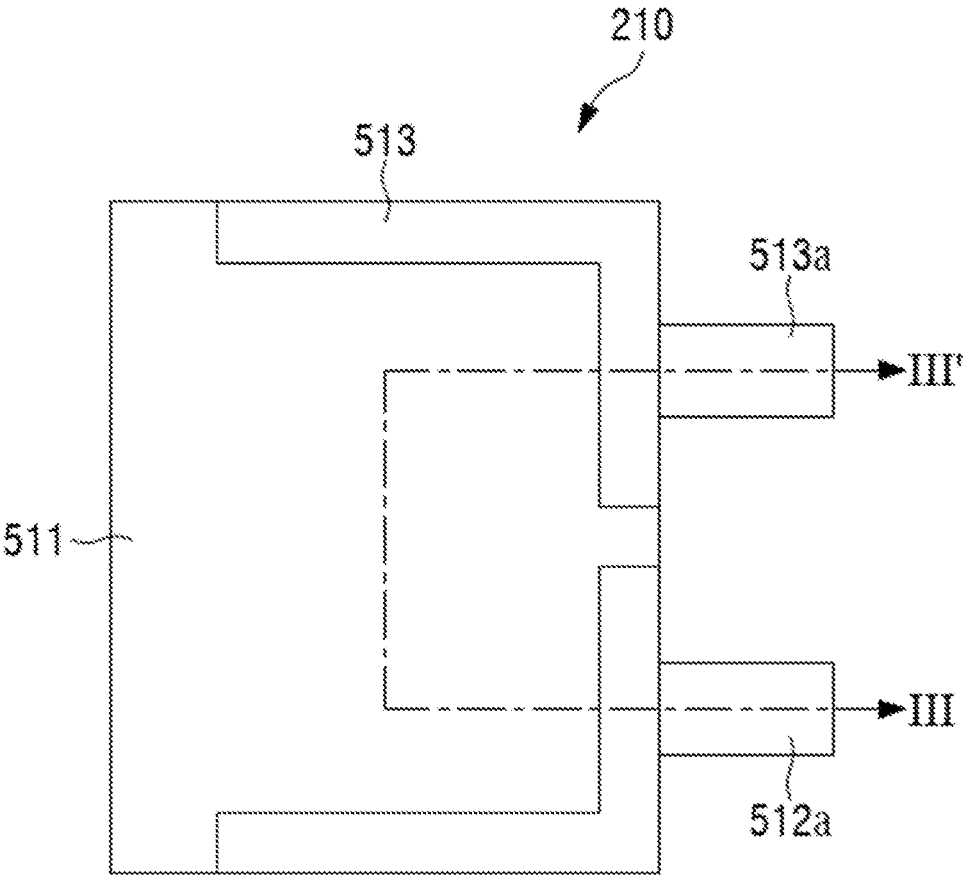
FIG. 15 is a schematic plan view illustrating an example of the first sound generating device of FIG. 14.
Figure 16:
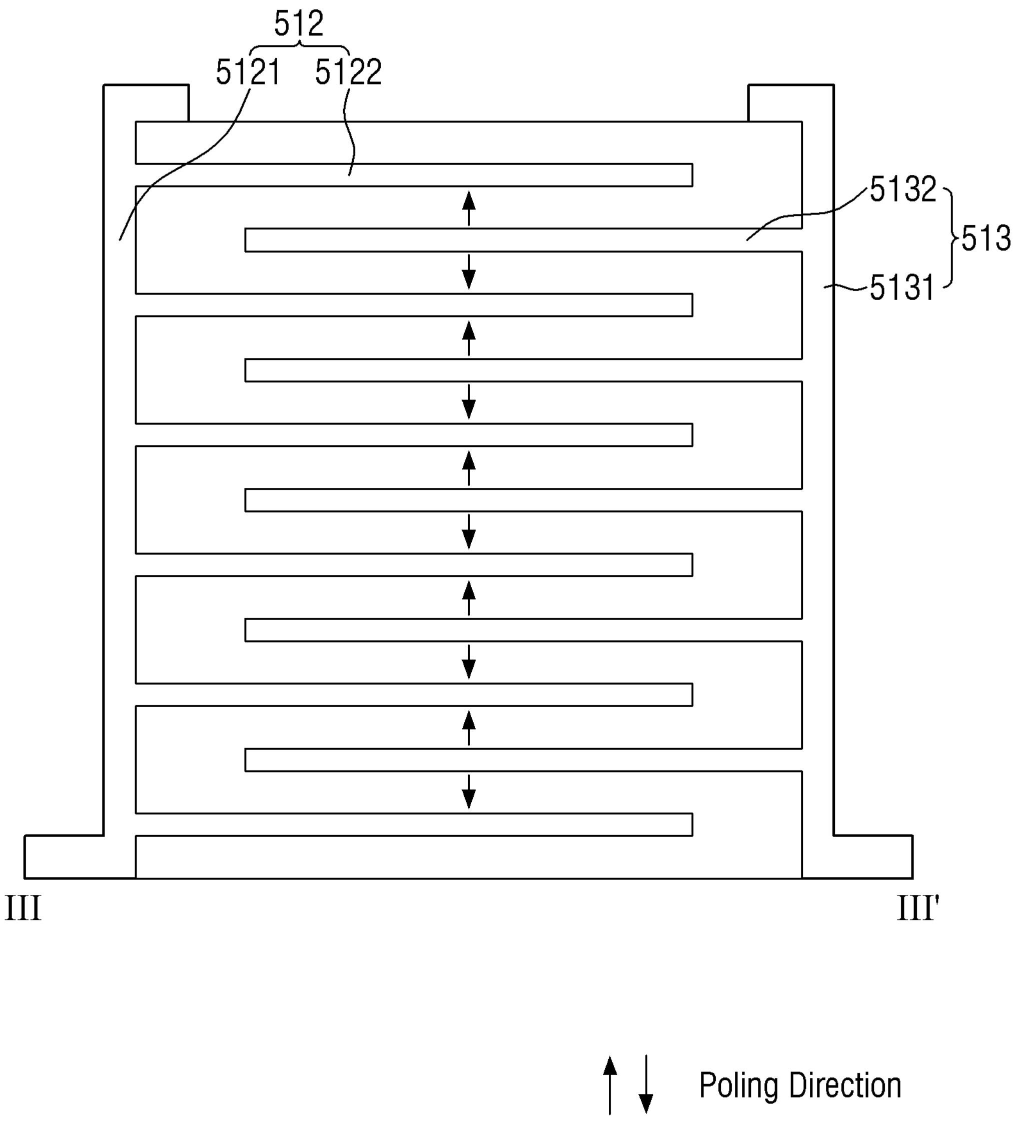
FIG. 16 is a schematic cross-sectional view illustrating an example taken along line III-III' of FIG. 14.

FIG. 14 is a schematic perspective view illustrating another example of the first sound generating device. FIG. 15 is a schematic plan view illustrating an example of the first sound generating device of FIG. 14. FIG. 16 is a schematic cross-sectional view illustrating an example taken along line III-III' of FIG. 14.

Referring to FIGS. 14 to 16, the first sound generating device 210 may be a piezoelectric element that contracts or expands in response to an applied voltage to vibrate the display panel 110. The first sound generating device 210 may include a vibration layer 511, a first electrode 512, a second electrode 513, a first pad electrode 512*a*, and a second pad electrode 513*a*.

The first electrode 512 may include a first stem electrode 5121 and first branch electrodes 5122. The first stem electrode 5121 may be disposed on only one side surface of the vibration layer 511 or may be disposed on multiple side surfaces of the vibration layer 511 as shown in FIGS. 14 to 16. The first stem electrode 5121 may be disposed on the top surface of the vibration layer 511. The first branch electrodes 5122 may branch from the first stem electrode 5121. The first branch electrodes 5122 may be disposed side by side.

The second electrode 513 may include a second stem electrode 5131 and second branch electrodes 5132. The second stem electrode 5131 may be disposed on another side surface of the vibration layer 511 or may be disposed on multiple side surfaces of the vibration layer 511 as shown in FIGS. 14 to 16. As shown in FIGS. 15 and 16, the first stem electrode 5121 may be disposed on at least one of the multiple side surfaces on which the second stem electrode 5131 is disposed. The second stem electrode 5131 may be disposed on the top surface of the vibration layer 511. The first stem electrode 5121 and the second stem electrode 5131 may not overlap each other. The second branch electrodes 5132 may branch from the second stem electrode 5131. The second branch electrodes 5132 may be disposed side by side.

The first branch electrodes 5122 and the second branch electrodes 5132 may be disposed side by side in the horizontal direction. Further, the first branch electrodes 5122 and the second branch electrodes 5132 may be alternately disposed in the vertical direction. For example, the first branch electrodes 5122 and the second branch electrodes 5132 may be repeatedly arranged in the vertical direction in the order of the first branch electrode 5122, the second branch electrode 5132, the first branch electrode 5122, and the second branch electrode 5132.

The first pad electrode 512*a* may be connected to the first electrode 512. The first pad electrode 512*a* may protrude outward from the first stem electrode 5121 disposed on a side surface of the vibration layer 511. The second pad electrode 513*a* may be connected to the second electrode 513. The second pad electrode 513*a* may protrude outward from the second stem electrode 5131 disposed on one side surface of the vibration layer 511. For example, the first pad electrode 512*a* and the second pad electrode 513*a* may protrude outward from the first stem electrode 5121 and the second stem electrode 5131 disposed on the same side surface of the vibration layer 511, respectively.

The first pad electrode 512*a* and the second pad electrode 513*a* may be connected to lead lines or pad electrodes of the first flexible circuit board. The lead lines or the pad electrodes of the first flexible circuit board may be disposed on the bottom surface of the first sound circuit board.

The vibration layer 511 may be a piezoelectric element that is deformed by the first driving voltage applied to the first electrode 512 and the second driving voltage applied to the second electrode 513. The vibrating layer 511 may be at least one of a piezoelectric material such as a polyvinylidene fluoride (PVDF) film or plumbum zirconate titanate (PZT), and an electro active polymer.

Since the manufacturing temperature of the vibration layer 511 is high, the first electrode 512 and the second electrode 513 may be formed of silver (Ag) having a high melting point or an alloy of silver (Ag) and palladium (Pd). In order to increase the melting points of the first electrode 512 and the second electrode 513, in case that the first electrode 512 and the second electrode 513 are made of an alloy of silver (Ag) and palladium (Pd), the content of silver (Ag) may be higher than the content of palladium (Pd).

The vibration layer 511 may be disposed between the first branch electrodes 5122 and the second branch electrodes 5132. The vibration layer 511 may contract or expand depending on the difference between the first driving voltage applied to the first branch electrode 5122 and the second driving voltage applied to the second branch electrode 5132.

Specifically, as shown in FIG. 16, the poling direction of the vibrating layer 511 disposed between the first branch electrode 5122 and the second branch electrode 5132 disposed under the first branch electrode 5122 may be an upward direction (↑). The vibration layer 511 may have a positive polarity in an upper area adjacent to the first branch electrode 5122 and a negative polarity in a lower area adjacent to the second branch electrode 5132. Further, the poling direction of the vibration layer 511 disposed between the second branch electrode 5132 and the first branch electrode 5122 disposed under the second branch electrode 5132 may be a downward direction (↓). The vibration layer 511 may have a negative polarity in an upper area adjacent to the second branch electrode 5132 and a positive polarity in a lower area adjacent to the first branch electrode 5122. The poling direction of the vibrating layer 511 may be determined by a poling process of applying an electric field to the vibrating layer 511 using the first branch electrode 5122 and the second branch electrode 5132.

Figure 17:
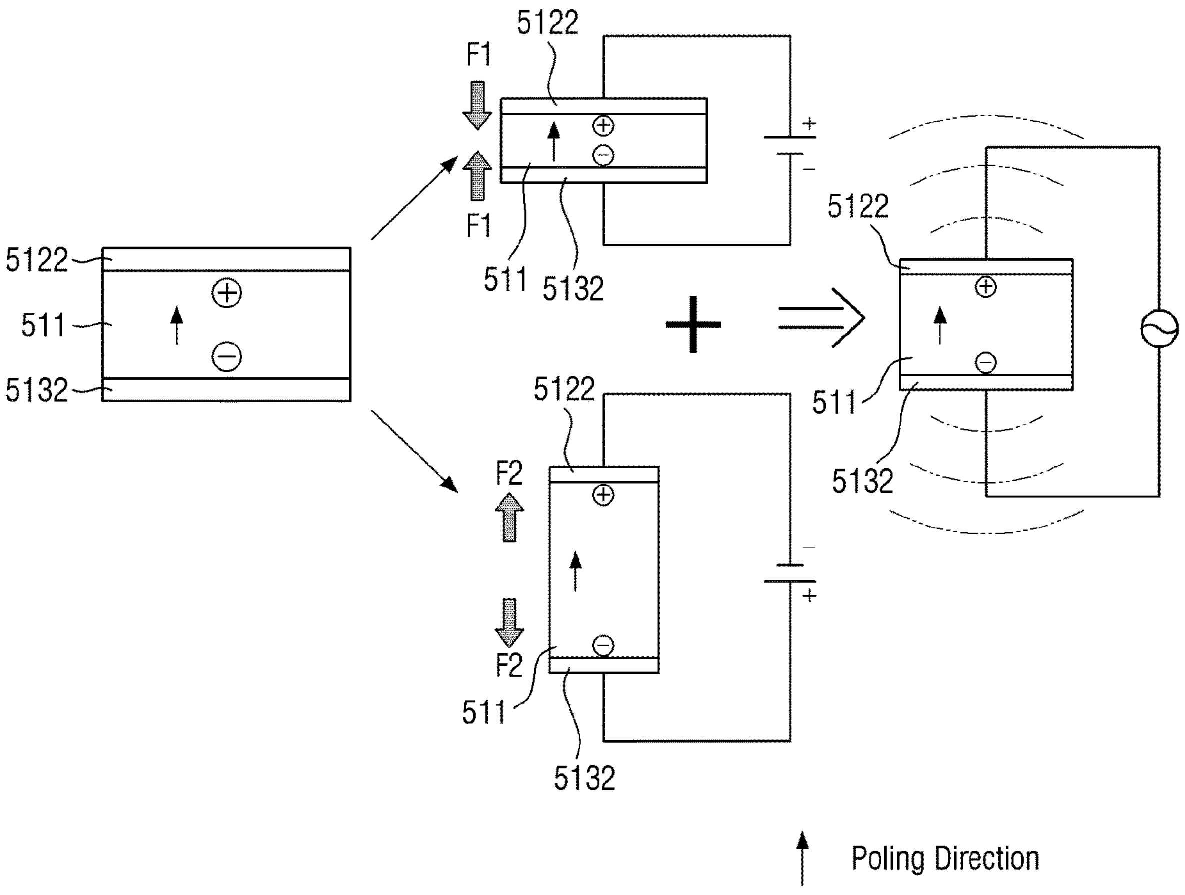
FIG. 17 schematically shows an example of a method of vibrating a vibrating layer disposed between a first branch electrode and a second branch electrode of a first sound generating device.
Figure 18:
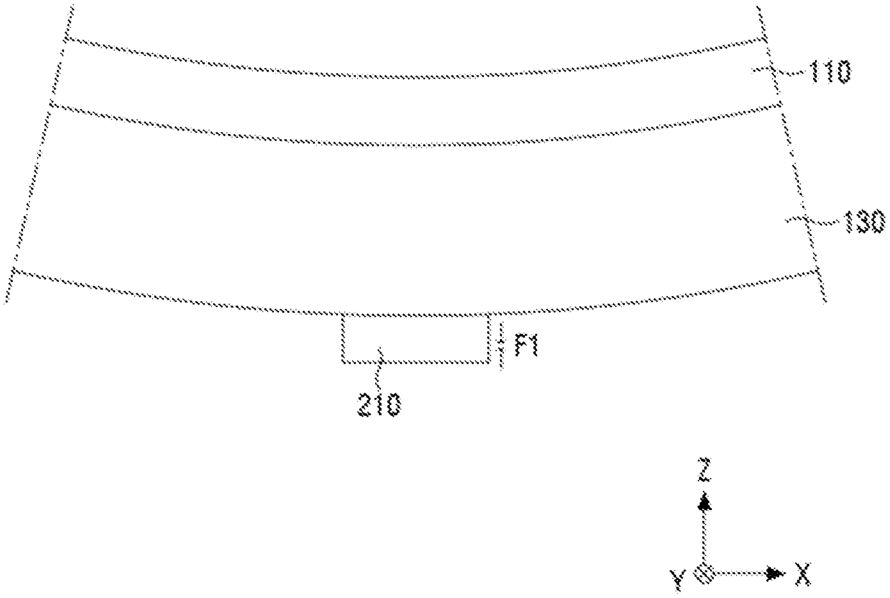
FIGS. 18 and 19 are schematic side views illustrating vibration of a display panel due to vibration of the first sound generating device shown in FIGS. 14, 15, and 16.
Figure 19:
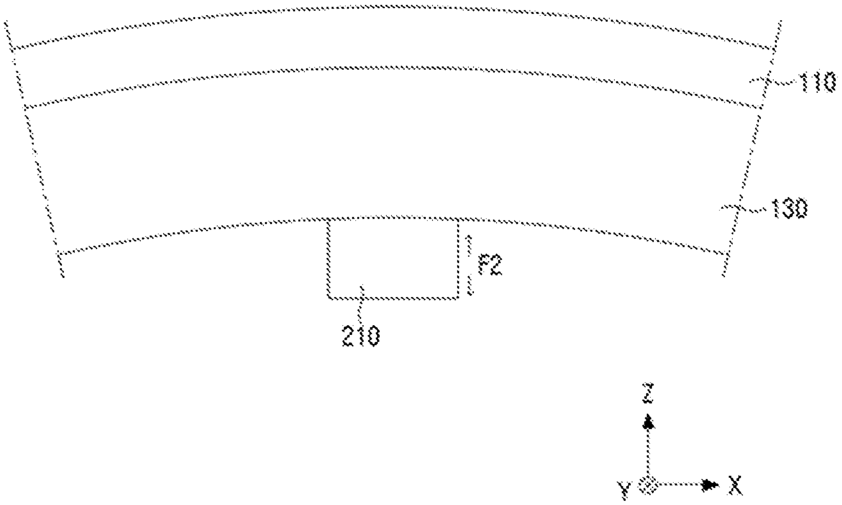

FIG. 17 schematically shows an example of a method of vibrating a vibrating layer disposed between a first branch electrode and a second branch electrode of a first sound generating device. FIGS. 18 and 19 are schematic side views illustrating vibration of a display panel due to vibration of the first sound generating device shown in FIGS. 14, 15, and 16.

As shown in FIG. 17, in case that the poling direction of the vibration layer 511 disposed between the first branch electrode 5122 and the second branch electrode 5132 disposed under the first branch electrode 5122 is the upward direction (↑), if the first driving voltage of positive polarity is applied to the first branch electrode 5122 and the second driving voltage of negative polarity is applied to the second branch electrode 5132, the vibration layer 511 may be contracted by a first force F1. The first force F1 may be a contraction force. Further, in case that the first driving voltage of negative polarity is applied to the first branch electrode 5122 and the second driving voltage of positive polarity is applied to the second branch electrode 5132, the vibration layer 511 may be expanded by a second force F2. The second force F2 may be an extension force.

Further, in case that the poling direction of the vibration layer 511 disposed between the second branch electrode 5132 and the first branch electrode 5122 disposed under the second branch electrode 5132 is the downward direction (↓) (not shown in FIG. 17), if the first driving voltage of positive polarity is applied to the two branch electrodes 5132 and the second driving voltage of negative polarity is applied to the first branch electrode 5122, the vibration layer 511 may be expanded by the extension force. Further, in case that the first driving voltage of negative polarity is applied to the second branch electrode 5132 and the second driving voltage of positive polarity is applied to the first branch electrode 5122, the vibration layer 511 may be contracted by the contraction force. The second force F2 may be an extension force.

In accordance with the embodiment shown in FIGS. 18 and 19, in case that the positive polarity and the negative polarity of the first driving voltage applied to the first electrode 512 and the second driving voltage applied to the second electrode 513 are alternately repeated, the vibration layer 511 is repeatedly contracted and expanded. Accordingly, the first sound generating device 210 may vibrate.

Since the first sound generating device 210 may be disposed on the bottom surface of the display panel 110, in case that the vibration layer 511 of the first sound generating device 210 is contracted and expanded, the display panel 110 may vibrate downward and upward due to the stress as shown in FIGS. 17 and 18. Since the display panel 110 may vibrate by the first sound generating device 210, the display device 10 may output the sound.

Figure 20:
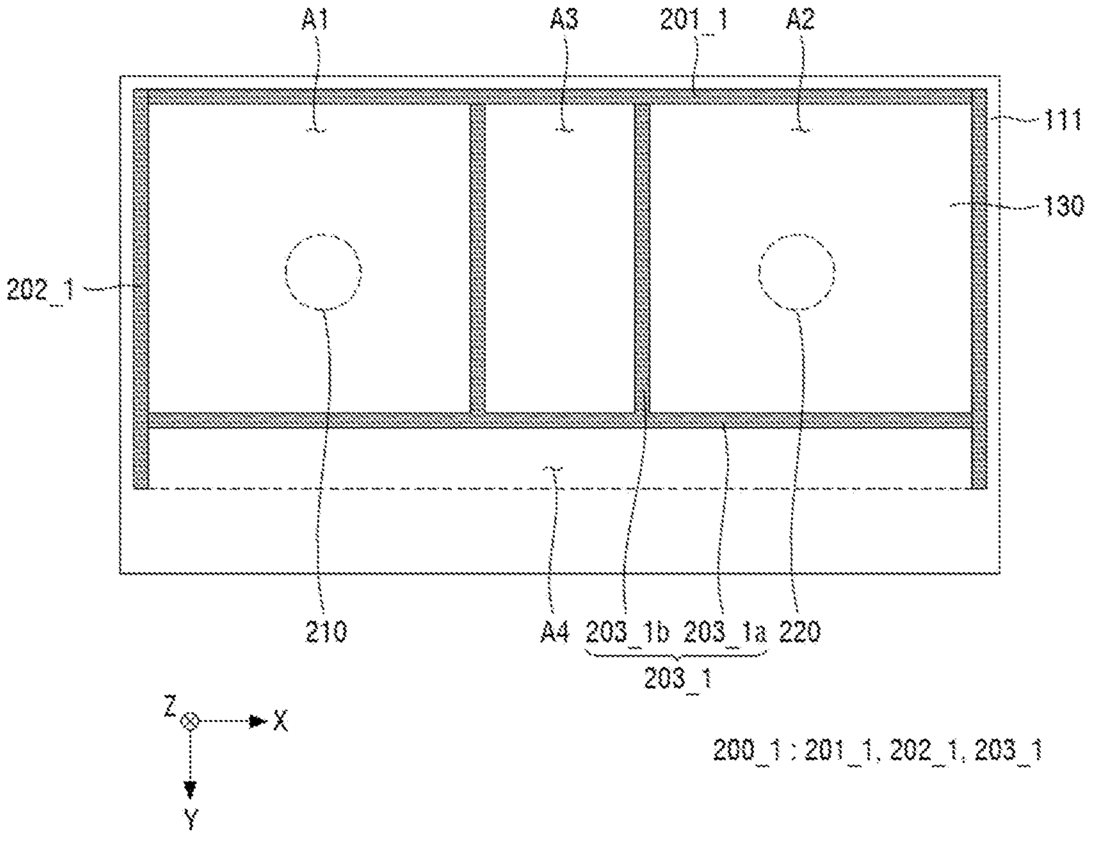
FIG. 20 is a schematic bottom view illustrating a blocking element and sound generating devices of a display device according to another embodiment.

FIG. 20 is a schematic bottom view illustrating a blocking element and sound generating devices of a display device according to another embodiment.

In FIG. 20, for simplicity of description, only the first substrate 111, the heat dissipation film 130, the blocking element 200_1, the first sound generating device 210, and the second sound generating device 220 of the display panel 110 are illustrated. For example, the source driving circuits 121, the flexible films 122, the source circuit boards 140, the cables 150, the control circuit board 160, the timing control circuit 170, and the lower cover 180 are omitted.

The embodiment shown in FIG. 20 may be different from the embodiment shown in FIG. 6 at least in that the fourth blocking element 204 (see FIG. 6) attached to the bottom portion of the heat dissipation film 130 and the fourth area A4 (see FIG. 6) are omitted.

The embodiment may be different from the embodiment shown in FIG. 6 at least in that a second portion 203_1*b* of a third blocking element 203_1, which extends along the Y-axis direction at the central portion of a first portion 203_1*a* of the third blocking element 203_1 extending in the X-axis direction, is in contact with the central portion of a first blocking element 201_1 positioned at the upper edge of the heat dissipation film 130, and the first portion 203_1*a* of the third blocking element 203_1 extends along the X-axis direction and is brought into contact with a second blocking element 202_1 at both ends of the first portion 203_1*a* of the third blocking element 203_1.

Therefore, unlike the embodiment shown in FIG. 6, the first area A1 in which the first sound generating device 210 is disposed may be defined by the first blocking element 201_1 disposed adjacent to the first sound generating device 210, the second blocking element 202_1 disposed adjacent to the first sound generating device 210, the first portion 203_1*a* of the third blocking element 203_1, and the second portion 203_1*b* of the third blocking element 203_1, and the second area A2 in which the second sound generating device 220 is disposed may be defined by the first blocking element 201_1 disposed adjacent to the second sound generating device 220, the second blocking element 202_1 disposed adjacent to the second sound generating device 220, the first portion 203_1*a* of the third blocking element 203_1, and the second portion 203_1$b$ of the third blocking element 203_1 that are disposed to surround the second sound generating device 220.

Further, unlike the embodiment shown in FIG. 6, the fourth blocking element 204 (see FIG. 6) is omitted, so that the fourth area A4 disposed between the first blocking element 201 (see FIG. 6) and the fourth blocking element 204 and between the second blocking element 202 (see FIG. 6) and the fourth blocking element 204 may be omitted.

The description of the third area A3 and the fourth area A4 illustrated in FIG. 20 may be the same as the description made in conjunction with FIG. 6, so description thereof will be omitted.

Also in the case of the embodiment illustrated in FIG. 20, the first area A1 and the second area A2 may define a sealed air gap space, so that it may be possible to secure the space where the first sound generating device 210 and the second sound generating device 220 may vibrate, and also possible to prevent the sound generated by the first sound generating device 210 and the second sound generating device 220 from being leaked to the outside along the side surfaces of the display device due to the first blocking element 201_1, the second blocking element 202_1, and the third blocking element 203_1 defining the first area A1 and the second area A2, thereby obtaining the same effect as the embodiment illustrated in FIG. 6. Further, since the fourth blocking element 204_1 is omitted, the process step may be omitted, which makes it possible to obtain the effect of increasing productivity and reducing costs.

Hereinafter, the embodiments will be described in more detail using some test examples.

Figure 21:
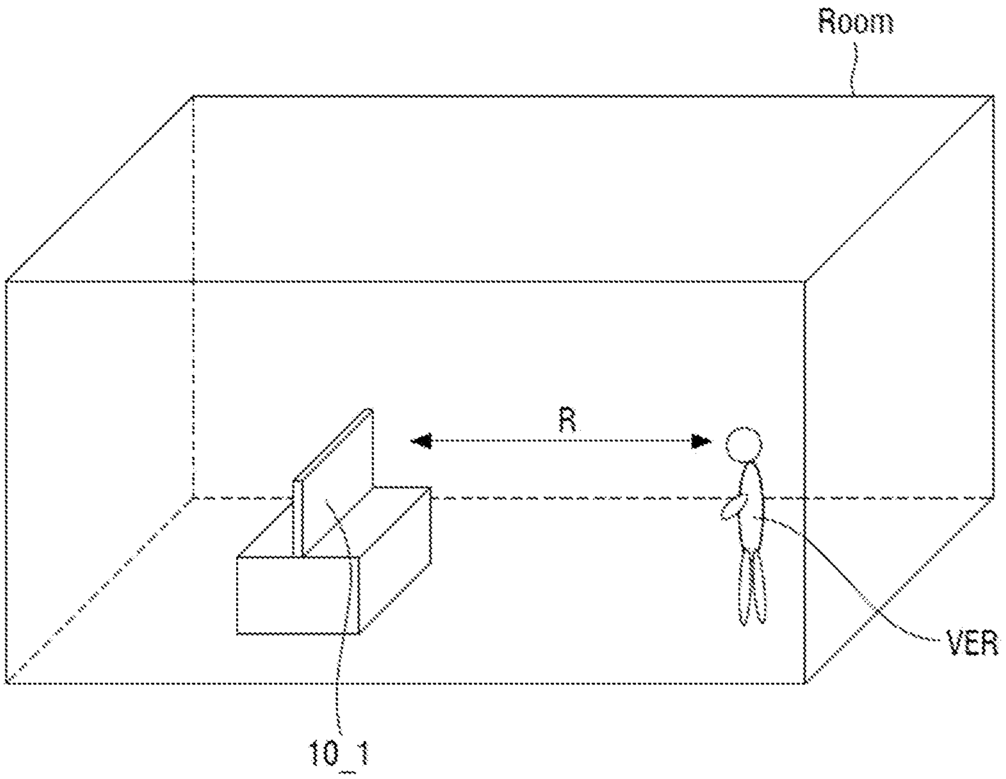
FIG. 21 is a schematic diagram illustrating a method for evaluating acoustic characteristics of a display device.
Figure 22:
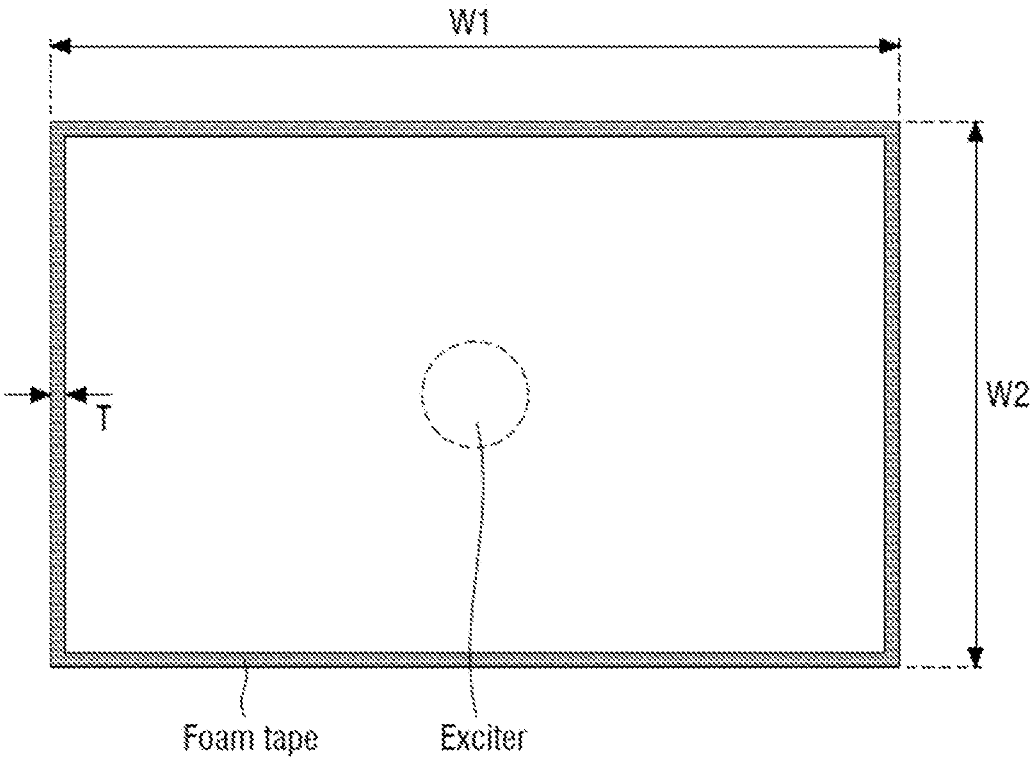
FIG. 22 is a schematic plan view illustrating a display panel used in the method for evaluating acoustic characteristics.
Figure 23:
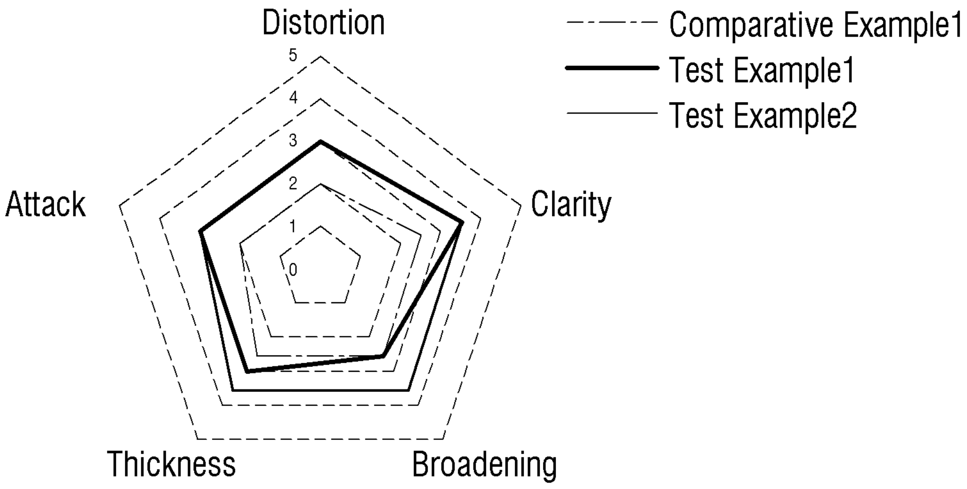
FIGS. 23 and 24 are schematic diagrams showing results of the method for evaluating acoustic characteristics shown in FIG. 21.
Figure 24:
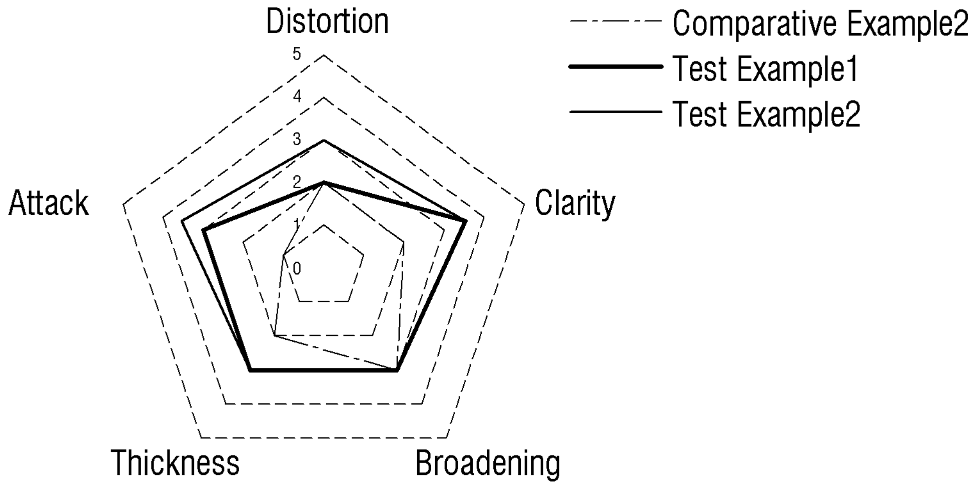

FIG. 21 is a schematic diagram illustrating a method for evaluating acoustic characteristics of a display device. FIG. 22 is a schematic plan view illustrating a display panel used in the method for evaluating acoustic characteristics. FIGS. 23 and 24 are schematic diagrams showing results of the method for evaluating acoustic characteristics shown in FIG. 21.

Referring to FIGS. 21 and 22, in a soundproof room in which a display device 10_1 including a 32-inch display panel may be installed, an evaluator VER may listen to multiple sound sources generated by the display device 10 and evaluate five items for evaluating acoustic characteristics. A distance R between the evaluator VER and the display device 10_1 may be set to 1.5 m to 2 m.

The display panel used in the evaluation of the acoustic characteristics of the display device 10_1 generating multiple sound sources, which may be the 32-inch display panel having one vibrating element at the center of the rear surface thereof, may be different from a 65-inch display panel according to an embodiment that has two vibrating elements on the rear surface thereof. Although the display panel that may be used in the evaluation of the acoustic characteristics of the display device 10_1 may be different from the display panel according to an embodiment in the size of the display panel and the number of vibrating elements, the evaluation results of the acoustic characteristics of the display device 10_1 using the 32-inch display panel may be equally applied to the display device 10 including the 65-inch display panel according to an embodiment, because only one vibrating element may be installed due to the size of the display panel that may be reduced to a half.

Specifically, referring to FIG. 22, the 32-inch display panel used in the acoustic characteristic evaluation may have a horizontal length W1 of 713.1 mm and a vertical length W2 of 411.7 mm, and is disposed along the edge of the display panel, and a tape including a buffer layer has a thickness T of 5 mm to 6 mm. Further, the display device 10_1 may be different from the display device 10 according to an embodiment at least in that one tape is disposed along the edge of the display panel. The tape disposed at the edge of the display panel used in the evaluation of the acoustic characteristics of the display device 10_1 may be substantially the same as any of the first blocking element 201 to the fourth blocking element 204 disposed on the display panel according to an embodiment.

Five items are used to evaluate the acoustic characteristics. Specifically, the five items include distortion, clarity, broadening, thickness, and attack, and a score from 1 to 5 may be given to each item. The overall result of the five items given with the score from 1 to 5 is displayed in a pentagonal graph, and it is interpreted that the acoustic characteristics are improved as the number of high-score items included in the result increases.

TABLE 1

| | | Target Specifications | Comparative Example 1 | Test Example 1 | Test Example 2 | Test Example 3 |
|---|---|---|---|---|---|---|
| Pore Size (μm) | | 120~250 | 147 | 137 | 186 | 249 |
| CFD 25% (kg f/cm$^2$) | | 0.45 ± 0.10 | 0.31 | 0.51 | 0.39 | 0.15 |
| Sound Propagation Coefficient (C) | | >1,014 | 988 | 1,234 | 1,251 | 1,040 |
| Sound Damping Coefficient (tanδ) | Low sound range (1~100 Hz) | 0.20 ≤ x ≤ 0.40 | 0.21 | 0.23 | 0.24 | 0.37 |
| | Middle sound range (100~1 kHz) | 0.15 ≤ x ≤ 0.35 | 0.13 | 0.25 | 0.26 | 0.29 |
| | High sound range (1 k~10 kHz) | 0.10 ≤ x ≤ 0.30 | 0.11 | 0.24 | 0.21 | 0.21 |
| Determined as | | | NG | OK | OK | OK |

Referring to [Table 1], the target specifications of the tape may be set such that the diameter of the pore included in the buffer layer of the tape to be disposed on the display panel according to an embodiment is within a range of 120 μm to 250 μm, and the CFD (25%) value is 0.35 to 0.55, and the sound propagation coefficient value may be determined to mark a tape having a sound propagation coefficient value exceeding 1014 as OK, and to mark a tape having a sound propagation coefficient value less than 1014 as NG. For example, the tape that satisfies the target specifications may be marked as OK, and the tape that does not satisfy the target specifications may be marked as NG.

Further, even if the diameter of the pore included in the buffer layer and the CFD (25%) value do not satisfy the values corresponding to the target specifications, if the sound propagation coefficient value derived from the pore diameter and the CFD (25%) value satisfies the value corresponding to the target specifications, the result may be determined as OK. This is because the acoustic characteristics of the display device may be determined by collectively determining the diameter of the pore included in the buffer layer and the CFD (25%) value of the buffer layer. In other words, the acoustic characteristics of the display device may be determined based on the sound propagation coefficient value obtained by collectively determining the diameter of the pore included in the buffer layer and the CFD (25%) value of the buffer layer.

The target specifications may be set such that the tape has a sound damping coefficient value of 0.2 to 0.4 in the low-frequency sound range having a frequency of 1 Hz or more and less than 100 Hz, has a sound damping coefficient value of 0.15 to 0.35 in the middle-frequency sound range having a frequency of 100 Hz or more and less than 1 kHz, and has a sound damping coefficient value of 0.1 to 0.3 in the high-frequency sound range having a frequency of 1 kHz or more and less than 10 kHz, and it may be determined as OK in case that the above-described sound propagation coefficient has a target sound propagation coefficient value even if the target specifications may not be satisfied. In other words, it may be determined as OK in case that both the sound propagation coefficient value and the sound damping coefficient value satisfy the target specification values, and it may be also determined as OK in case that the sound propagation coefficient value satisfy the target specification value and the sound damping coefficient value may not satisfy the target specification value. It may be determined as NG in case that the sound propagation coefficient value may not satisfy the target specification value and the sound damping coefficient value satisfy the target specification value.

Therefore, the sound propagation coefficient value of the buffer layer included in the tape may be the most important criterion among various criteria for evaluating the acoustic characteristics of the display device.

In the case of Comparative Example 1, it may be determined as NG because the CFD (25%) value and the pore diameter satisfy the target specification values, but the sound propagation coefficient value derived from the CFD (25%) value and the pore diameter may be less than 1014. In the case of Comparative Example 1, the sound damping coefficient value may be less than the target specification value in the middle-frequency sound range.

In comparison, in the case of Test Examples 1 and 2, they may be determined as OK because both the CFD (25%) and the pore diameter satisfy the target specification values and, thus, the sound propagation coefficient derived therefrom may exceed the target specification value. In the case of Test Examples 1 and 2, the target sound damping coefficient value may be obtained.

In the case of Test Example 3, compared to Test Examples 1 and 2, it may be determined as OK because the sound propagation coefficient value may exceed 1014 although the pore diameter satisfy the target specification value and the CFD (25%) value may not satisfy the target specification value, and the target sound damping coefficient value may satisfy in all sound ranges.

Referring to FIG. 23, in the case of Test Example 1 that satisfies the target specifications, a higher score may be obtained in four items except the 'broadening' item compared to Comparative Example 1 that does not satisfy the target specifications, and in the case of Test Example 2, a higher score was obtained in all items compared to Comparative Example 1. Although not illustrated in FIG. 23, in the case of Test Example 3, both the sound propagation coefficient value and the sound damping coefficient value satisfy the target specification values, so that a higher score may be obtained in the multiple items compared to Comparative Example 1, similarly to Test Examples 1 and 2. Accordingly, in the case of using the tapes of Test Examples 1 to 3 satisfying the target specifications for the display device, the acoustic characteristics of the display device may be improved.

The tapes of Test Examples 1 to 3, which may be determined as OK in [Table 1], may correspond to any of the first blocking element 201 to the fourth blocking element 204 included in the display device 10 according to an embodiment described in conjunction with FIG. 6. For example, the tapes of Test Examples 1 to 3 may correspond to any of the third blocking element 203 and the fourth blocking element 204.

TABLE 2

| | | Target Specifications | Comparative Example 2 | Test Example 1 | Test Example 2 | Test Example 3 |
|---|---|---|---|---|---|---|
| Pore Size (μm) | | 120~250 | 75 | 196 | 153 | 167 |
| CFD 25% (kg f/cm$^2$) | | 0.45 ± 0.10 | 0.41 | 0.26 | 0.35 | 0.38 |
| Sound Propagation Coefficient (C) | | >1014 | 961 | 1059 | 1068 | 1160 |
| Sound Damping Coefficient (tanδ) | Low sound range (1~100 Hz) | 0.20 ≤ x ≤ 0.40 | 0.30 | 0.19 | 0.20 | 0.20 |
| | Middle sound range (100~1 kHz) | 0.15 ≤ x ≤ 0.35 | 0.25 | 0.19 | 0.25 | 0.25 |
| | High sound range (1 k~10 kHz) | 0.10 ≤ x ≤ 0.30 | 0.24 | 0.14 | 0.24 | 0.24 |
| Determined as | | | NG | OK | OK | OK |

Referring to [Table 2], the target specifications of the tape to be disposed on the display panel according to an embodiment may be set to be the same as those in Table 1, and in Test Examples 1 and 2 included in [Table 2], the tests may be conducted in a state where the size of the pore included in the buffer layer of the tape and the CFD (25%) value may be set to be different from the pore size and the CFD (25%) of Test Examples 1 and 2 included in [Table 1].

In the case of Comparative Example 2, it may be determined as NG because the sound propagation coefficient value derived from the CFD (25%) value and the pore diameter may be less than 1014 even if the pore diameter and the CFD (25%) value satisfy the target specification values. In the case of Comparative Example 2, it may be determined as NG because the sound damping coefficient value satisfy the target specification value but the sound propagation coefficient value may not satisfy the target specification value.

In comparison, in the case of Test Example 1, it may be determined as OK because the sound propagation coefficient value may exceed 1014 although the pore diameter satisfy the target specification value and the CFD (25%) value may not satisfy the target specification, and it may be determined as OK because the sound propagation coefficient value satisfy the target specification value although the range of the target sound damping coefficient value may not satisfy in the low-frequency sound range.

In the case of Test Examples 2 and 3, they may be determined as OK because both the CFD (25%) and the pore diameter satisfy the target specification values and, thus, the sound propagation coefficient value derived therefrom may exceed the target specification. In the case of Test Examples 2 and 3, the target sound damping coefficient value may satisfy, and the same sound damping coefficient value may be obtained in all sound ranges in Test examples 2 and 3.

Referring to FIG. 24, unlike the case of Comparative Example 2 that may be determined as NG because the sound damping coefficient value satisfy the target specification value but the sound propagation coefficient value may not satisfy the target specification, in the case of Test example 2 that may be determined as OK because the sound propagation coefficient value and the sound damping coefficient value satisfy the target specification values, a higher score may be obtained in four items except the 'broadening' item compared to Comparative Example 2. Although not illustrated in FIG. 24, in the case of Test Example 3, similarly to Test Example 2, both the sound propagation coefficient value and the sound damping coefficient value satisfy the target specification values, and the same sound damping coefficient value as that in Test Example 2 may be obtained in all sound ranges, which makes it possible to obtain a higher score in the multiple items compared to Comparative Example 2.

In the case of Test Example 1 that may be determined as OK because the sound propagation coefficient value satisfy the target specification value although the sound damping coefficient value may not satisfy the target specification value in the low-frequency sound range, unlike Comparative Example 2 that may be determined as NG because the sound damping coefficient value satisfy the target specification value but the sound propagation coefficient value may not satisfy the target specification value, a higher score may be obtained in four items except 'broadening' compared to Comparative Example 2. This indicates that the acoustic characteristics of the display device may be more affected by the sound propagation coefficient value between the sound propagation coefficient value and the sound damping coefficient value.

In the case of Test Example 2 that may be determined as OK because the sound propagation coefficient value and the sound damping coefficient value satisfy the target specification values, unlike Test example 1 that may be determined as OK because the sound propagation coefficient value satisfy the target specification value although the sound damping coefficient value may not satisfy the target specification value in the low-frequency sound range, a higher score may be obtained in the 'distortion' and 'attack' items compared to Test Example 1. This indicates that the acoustic characteristics of the display device may be further improved in case that the sound propagation coefficient value and the sound attenuation coefficient value satisfy the target specification values, compared to in case that only the sound propagation coefficient value satisfies the target specification value.

The tape of Test Examples 1 to 3 determined as OK in [Table 2] may correspond to any of the first blocking element 201 to the fourth blocking element 204 included in the display device 1 according to an embodiment described in conjunction with FIG. 6. For example, the tape of Test Examples 1 to 3 may correspond to any of the first blocking element 201 and the second blocking element 202.

Figure 25:
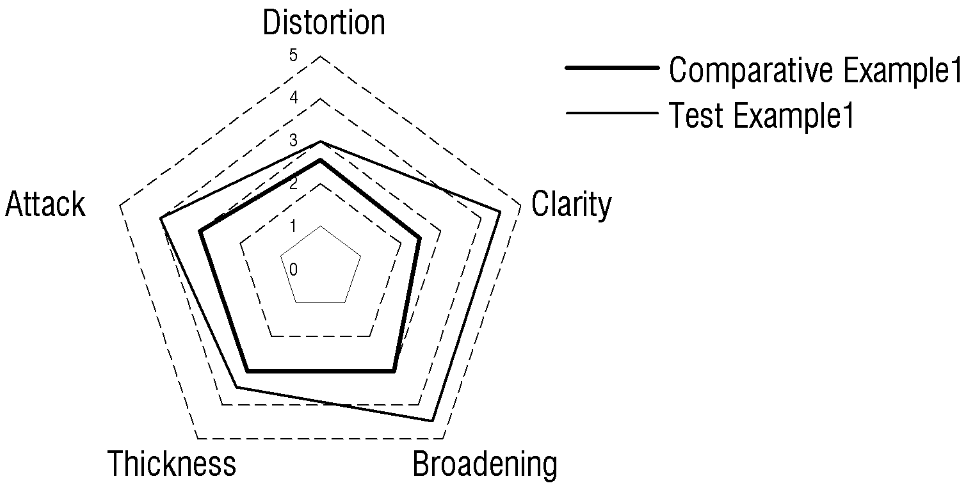
FIGS. 25 to 27 are schematic diagrams illustrating acoustic characteristics evaluation results of a display device according to an embodiment.
Figure 26:
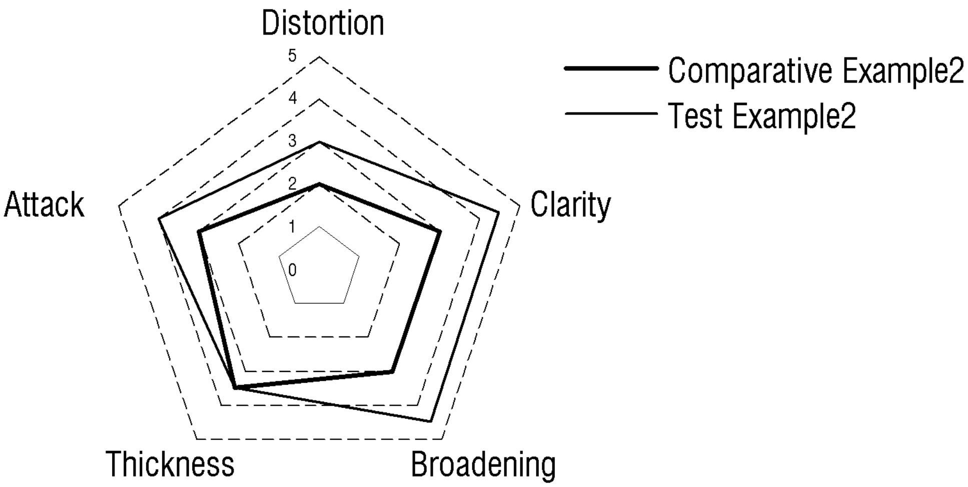
Figure 27:
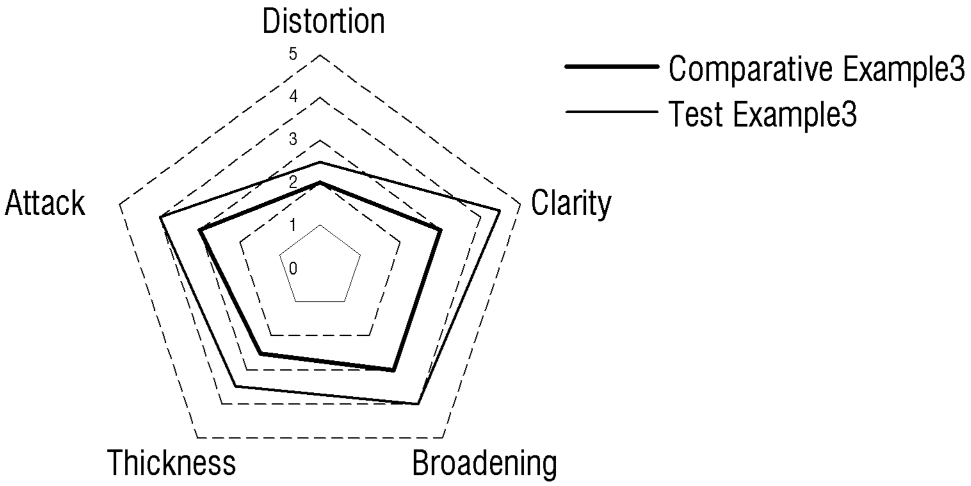

FIGS. 25 to 27 are schematic diagrams illustrating acoustic characteristics evaluation results of a display device according to an embodiment.

FIG. 25 illustrates the acoustic characteristic evaluation results obtained in Comparative Example 1 in which the tape corresponding to Comparative Example 2 of [Table 2] may be used for the second blocking element 202 among the first blocking element 201 to the fourth blocking element 204 included in the display device 10 according to an embodiment, and obtained in Test Example 1 in which the tape corresponding to Test Example 1 of [Table 2] may be used for the second blocking element 202.

Comparative Example 1 and Test Example 1 may be different only in the type of tape used for the second blocking element 202, and the same tape may be used for the first blocking element 201, the third blocking element 203, and the fourth blocking element 204.

Referring to FIG. 25, in the case of Test Example 1, high scores may be obtained in all items, compared to Comparative Example 1, so that it is clear that the acoustic characteristics of the display device 10 according to an embodiment may be improved in the case of using the tape corresponding to Test example 1 of [Table 2] for the second blocking element 202.

FIG. 26 shows the acoustic characteristic evaluation results obtained in Comparative Example 2 in which the tape corresponding to Comparative Example 1 of [Table 1] may be used for the third blocking element 203 among the first blocking element 201 to the fourth blocking element 204 included in the display device 10 according to an embodiment, and obtained in Test Example 2 in which the tape corresponding to Test Example 1 of [Table 1] may be used for the third blocking element 203.

Comparative Example 2 and Test Example 2 may be different only in the type of tape used for the third blocking element 203, and the same tape may be used for the first blocking element 201, the second blocking element 202, and the fourth blocking element 204.

Referring to FIG. 26, in the case of Test Example 2, high scores may be obtained in all items except the 'thickness' item, compared to Comparative Example 2, so that it is clear that the acoustic characteristics of the display device 10 according to an embodiment may be improved in the case of using the tape corresponding to Test Example 1 of [Table 1] for the third blocking element 203.

FIG. 27 shows the acoustic characteristic evaluation results obtained in Comparative Example 3 in which the tape corresponding to Comparative Example 1 of [Table 1] may be used for the fourth blocking element 204 among the first blocking element 201 to the fourth blocking element 204 included in the display device 10 according to an embodiment, and obtained in Test example 3 in which the tape corresponding to Test Example 1 of [Table 1] may be used for the fourth blocking element 204.

Comparative Example 3 and Test Example 3 may be different only in the type of tape used for the fourth blocking element 204, and the same tape may be used for the first blocking element 201, the second blocking element 202, and the third blocking element 203.

Referring to FIG. 27, in the case of Test Example 3, high scores were obtained in all items, compared to Comparative Example 3, so that it is clear that the acoustic characteristics of the display device 10 according to an embodiment may be improved in the case of using the tape corresponding to Test Example 1 of [Table 1] for the fourth blocking ember 204.

Figure 28:
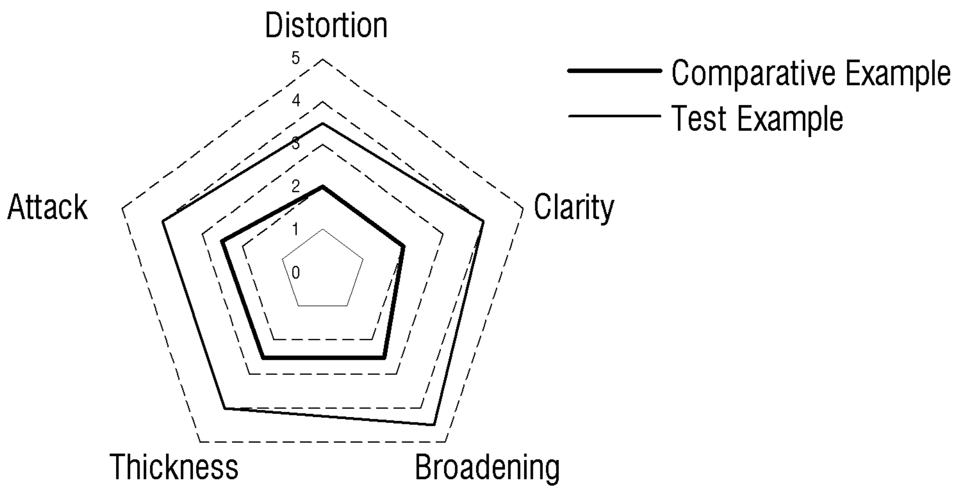
FIG. 28 schematically illustrates acoustic characteristic evaluation results of a display device according to another embodiment.

FIG. 28 schematically illustrates acoustic characteristic evaluation results of a display device according to another embodiment.

FIG. 28 illustrates the acoustic characteristic evaluation results obtained in Comparative Example in which the tape corresponding to Comparative Example 2 of [Table 2] may be used for the second blocking element 202_1 among the first blocking element 201_1 to the third blocking element 203_1 included in the display device according to another embodiment and the tape corresponding to Comparative Example 1 of [Table 1] may be used for the third blocking element 203_1, and obtained in Test example in which the same tape as that in Comparative Example may be used for the first blocking elements 201_1 among the first blocking element 202_1 to the third blocking element 203_1, the tape corresponding to Test Example 2 of [Table 2] may be used for the second blocking element 202_1, and the tape corresponding to Test Example 2 of [Table 1] may be used for the third blocking element 203_1.

Referring to FIG. 28, in the case of Test Example, high scores obtained in all items may be compared to Comparative Example, so that it is clear that the acoustic characteristics of the display device according to another embodiment may be improved in the case of using the tape corresponding to Test Example 2 of [Table 2] for the second blocking element 202_1, and using the tape corresponding to Test Example 2 of [Table 1] for the third blocking element 203_1.

Accordingly, even in case that the fourth blocking element 204 is omitted in the display device according to another embodiment, it may be possible to provide the display device having improved acoustic characteristics, similarly to the display device according to an embodiment.

In concluding the detailed description, those skilled in the art will appreciate that many variations and modifications can be made to the embodiments without substantially departing from the principles of the disclosure. Therefore, the disclosed embodiments of the disclosure are used in a generic and descriptive sense only and not for purposes of limitation.

What is claimed is:

1. A display device comprising:

a display panel comprising a substrate including a first side extending in a first direction and a second side extending in a second direction intersecting the first direction, and a light emitting element layer positioned on a first surface of the substrate;

a first vibrating element disposed on a second surface of the substrate and that vibrates the display panel to output a first sound;

a first buffer layer disposed on the second surface of the substrate and disposed between the first side and the first vibrating element; and a second buffer layer disposed on the second surface of the substrate and disposed between the second side and the first vibrating element, wherein the first buffer layer comprises a first pore, and the second buffer layer comprises a second pore, and a first sound propagation coefficient value of the first buffer layer and a second sound propagation coefficient value of the second buffer layer satisfy the following Eq. (1):

$$1014 < C < 1565 \quad (1)$$

where C is the sound propagation coefficient of the first buffer layer and the second buffer layer, and has a unit of cm/s, and the C satisfies the following Eq. (2):

$$C = \sqrt{\frac{CFD}{\rho_s}} \quad (2)$$

where CFD is a load value received by the first buffer layer and the second buffer layer in case that a thickness of the first buffer layer and the second buffer layer is compressed by 25%, and has a unit of gf/cm$^2$, the $\rho_s$ is an estimated density of the first buffer layer and the second buffer layer, which is estimated from diameters of the first pore comprised in the first buffer layer and the second pore comprised in the second buffer layer, and has a unit of g/cm$^3$, and the $\rho_s$ satisfies the following Eq. (3):

$$\rho_s = \frac{328.17 - c_s}{528.81} \quad (3)$$

where $c_s$ is the diameter of the first pore comprised in the first buffer layer and the diameter of the second pore comprised in the second buffer layer, and has a unit of μm.

2. The display device of claim 1, wherein the sound propagation coefficient value of the first buffer layer is different from the sound propagation coefficient value of the second buffer layer.

3. The display device of claim 1, wherein a first sound damping coefficient value of the first buffer layer and a second sound damping coefficient value of the second buffer layer are:

0.2 to 0.4 in a low-frequency sound range;

0.15 to 0.35 in a middle-frequency sound range; and 0.1 to 0.3 in a high-frequency sound range.

4. The display device of claim 3, wherein the low-frequency sound range has a frequency of 1 Hz or more and less than 100 Hz, the middle-frequency sound range has a frequency of 100 Hz or more and less than 1 kHz, and the high-frequency sound range has a frequency of 1 kHz or more and less than 10 kHz.

5. The display device of claim 1, wherein the diameter of the first pore comprised in the first buffer layer and the diameter of the second pore comprised in the second buffer layer are 120 μm to 250 μm.

6. The display device of claim 1, further comprising:

a lower cover disposed on the second surface of the substrate; and a heat dissipation film disposed between the second surface of the substrate and the lower cover, wherein the first buffer layer and the second buffer layer are disposed between the second surface of the substrate and the lower cover.

7. The display device of claim 6, wherein the first vibrating element comprises:

a bobbin disposed on the second surface of the substrate;

a voice coil surrounding the bobbin;

a magnet disposed on the bobbin and spaced apart from the bobbin; and a lower plate disposed on the magnet and fixed to the lower cover by a fixing member.

8. The display device of claim 6, further comprising:

a first adhesive layer disposed on a first surface of the first buffer layer;

a second adhesive layer disposed on a second surface of the first buffer layer;

a third adhesive layer disposed on a first surface of the second buffer layer;

a base film layer disposed on a second surface of the second buffer layer; and a fourth adhesive layer disposed on the second surface of the second buffer layer with the base film layer interposed therebetween.

9. The display device of claim 6, further comprising:

a second vibrating element disposed on the second surface of the substrate and that vibrates the display panel to output a second sound; and a third buffer layer disposed on the second surface of the substrate and comprising a first portion, a second portion, and a third portion, wherein the first portion extends in the first direction and is disposed between the first vibrating element and the first side and between the second vibrating element and the first side, the second portion and the third portion extend from the first portion in the second direction and are disposed between the first vibrating element and the second vibrating element, and the second portion and the third portion face each other.

10. The display device of claim 9, wherein the first portion of the third buffer layer is in physical contact with the second buffer layer, and the second portion and the third portion of the third buffer layer are in physical contact with the first buffer layer.

11. The display device of claim 9, wherein the third buffer layer is disposed between the heat dissipation film and the lower cover.

12. The display device of claim 9, wherein a sound propagation coefficient value of the third buffer layer is different from a sound propagation coefficient value of the first buffer layer and a sound propagation coefficient value of the second buffer layer.

13. The display device of claim 1, wherein the first buffer layer contains a first material, and the second buffer layer contains a second material different from the first material.

14. The display device of claim 1, wherein the first buffer layer extends in the first direction, and the second buffer layer extends in the second direction.

* * * * *